June 11, 1968
F. H. BRICMONT ET AL
3,387,834
HEARTH FIRING APPARATUS
Filed March 21, 1966
8 Sheets-Sheet 1
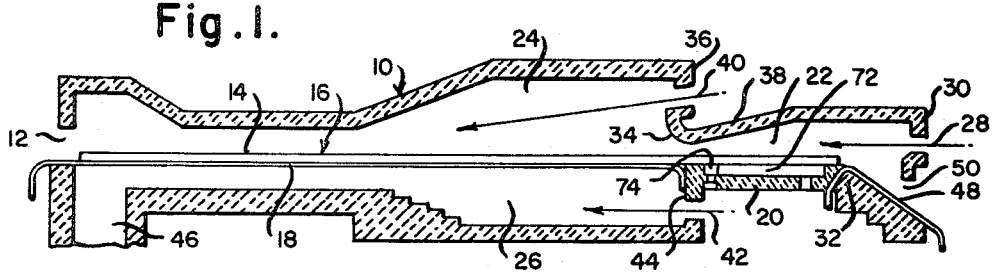
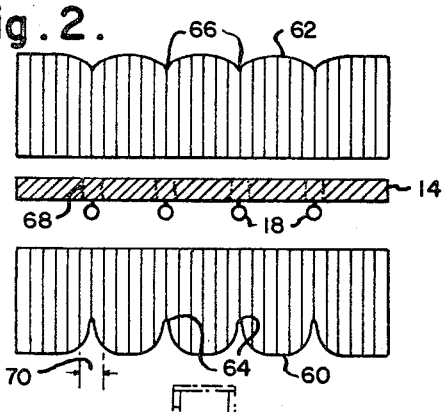
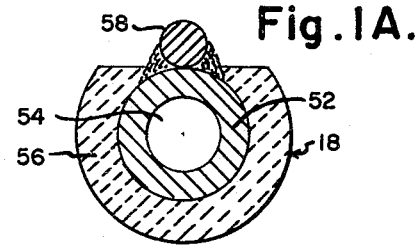
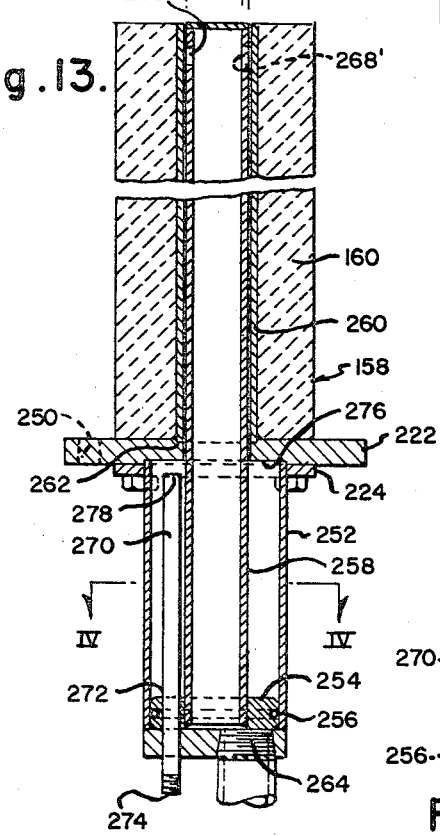
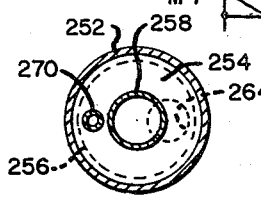
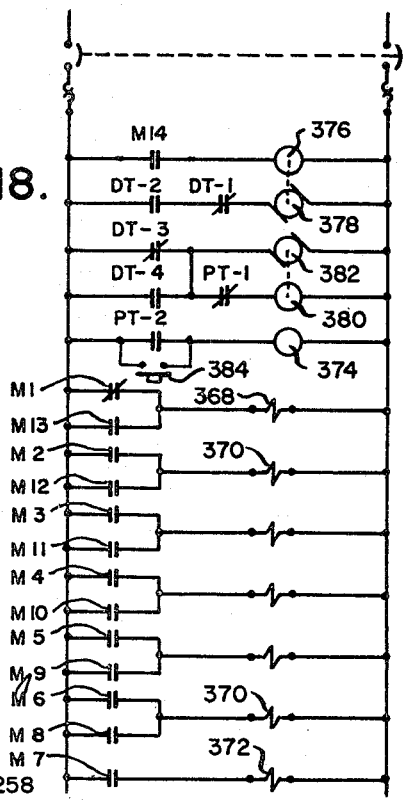
INVENTORS
Frances H. Bricmont &
Franklin H. Miller

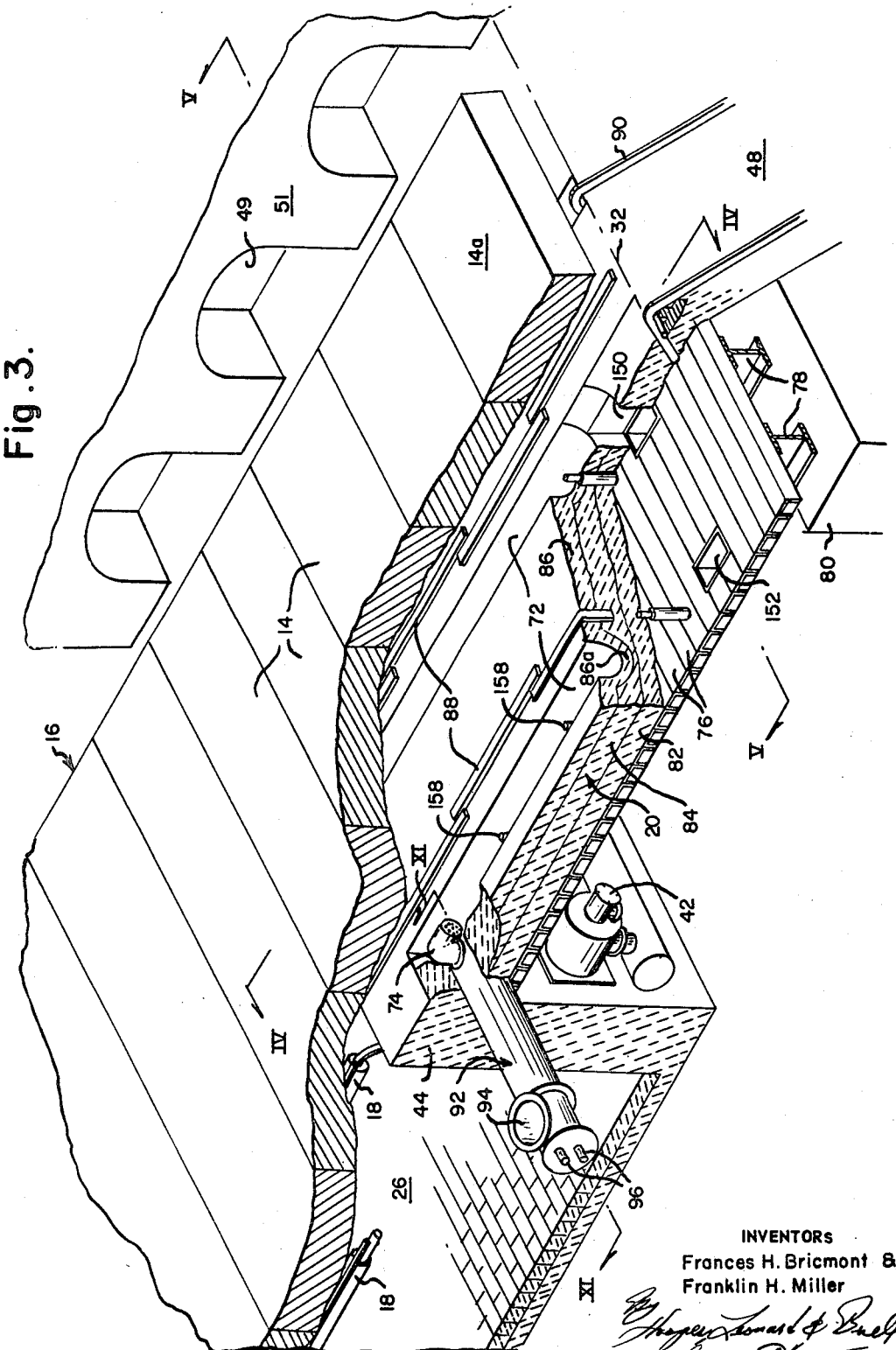

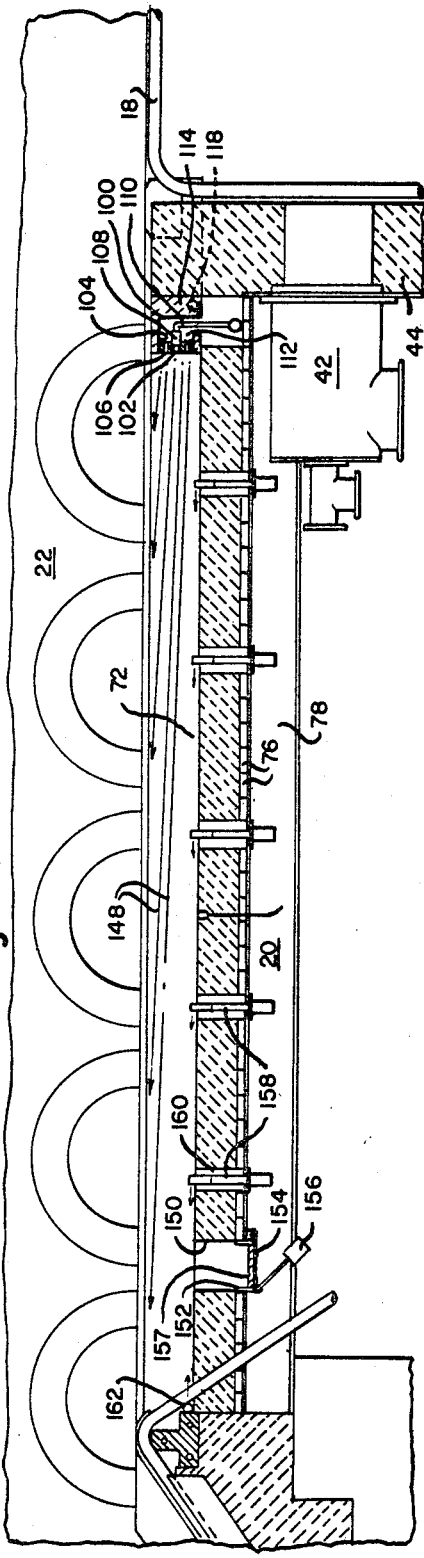
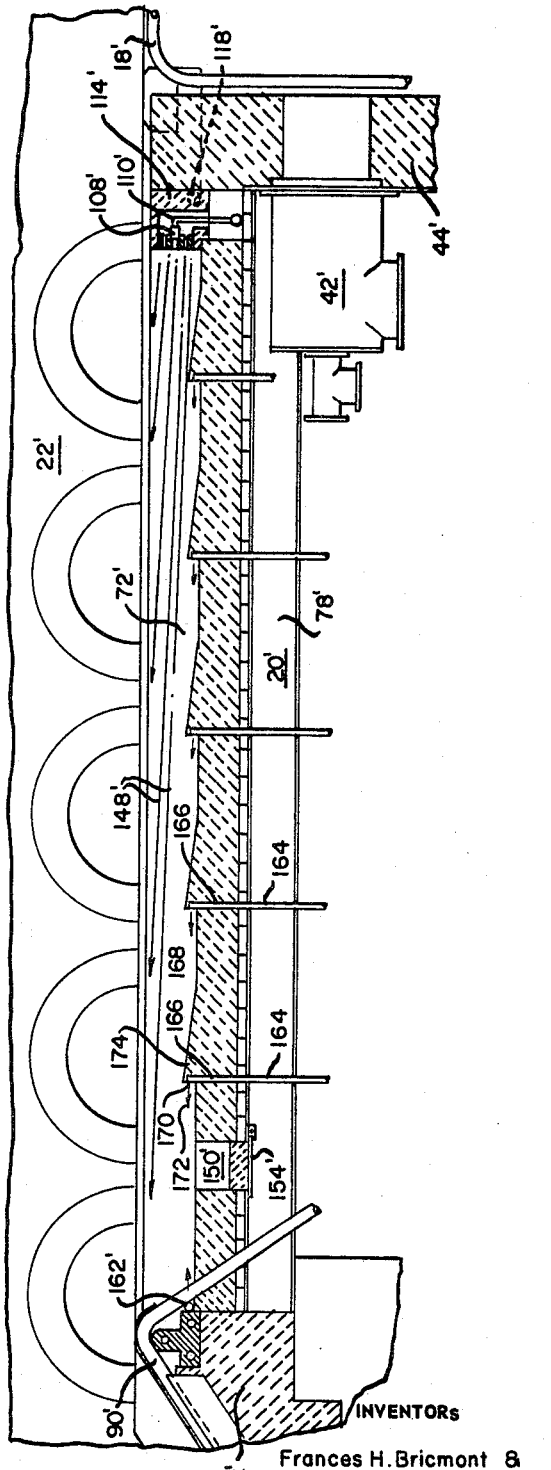

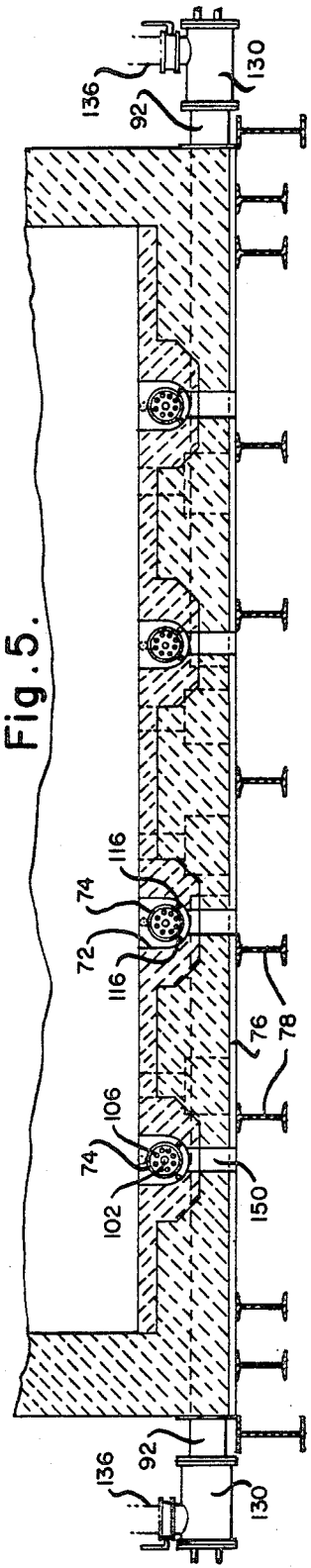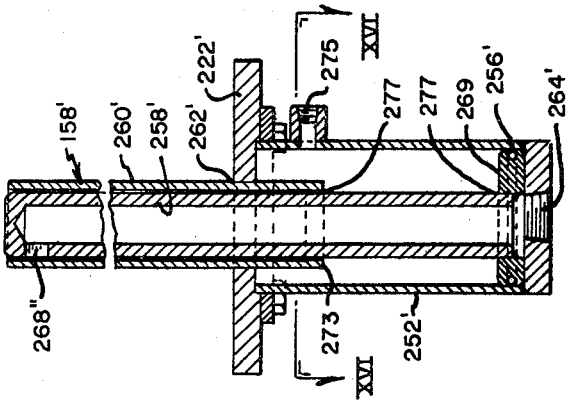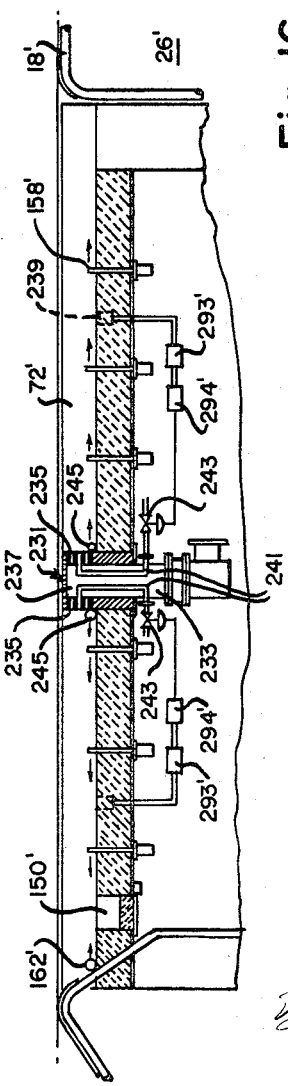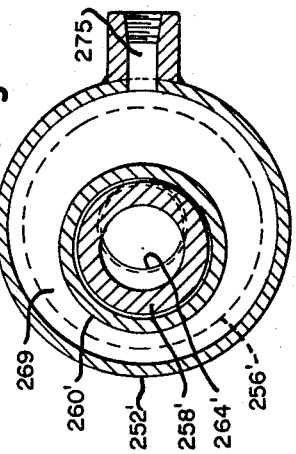
INVENTORS
Frances H. Bricmont &
Franklin H. Miller June 11, 1968　　F. H. BRICMONT ET AL　　3,387,834
HEARTH FIRING APPARATUS Filed March 21, 1966　　8 Sheets-Sheet 5

INVENTORS
Frances H. Bricmont &
Franklin H. Miller

INVENTORS
Frances H. Bricmont &
Franklin H. Miller

INVENTORS
Frances H. Bricmont &
Franklin H. Miller

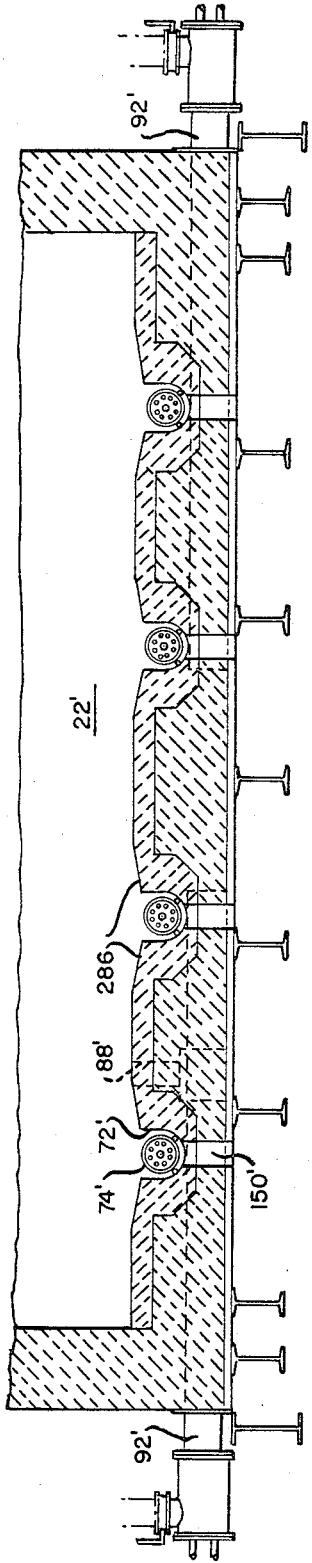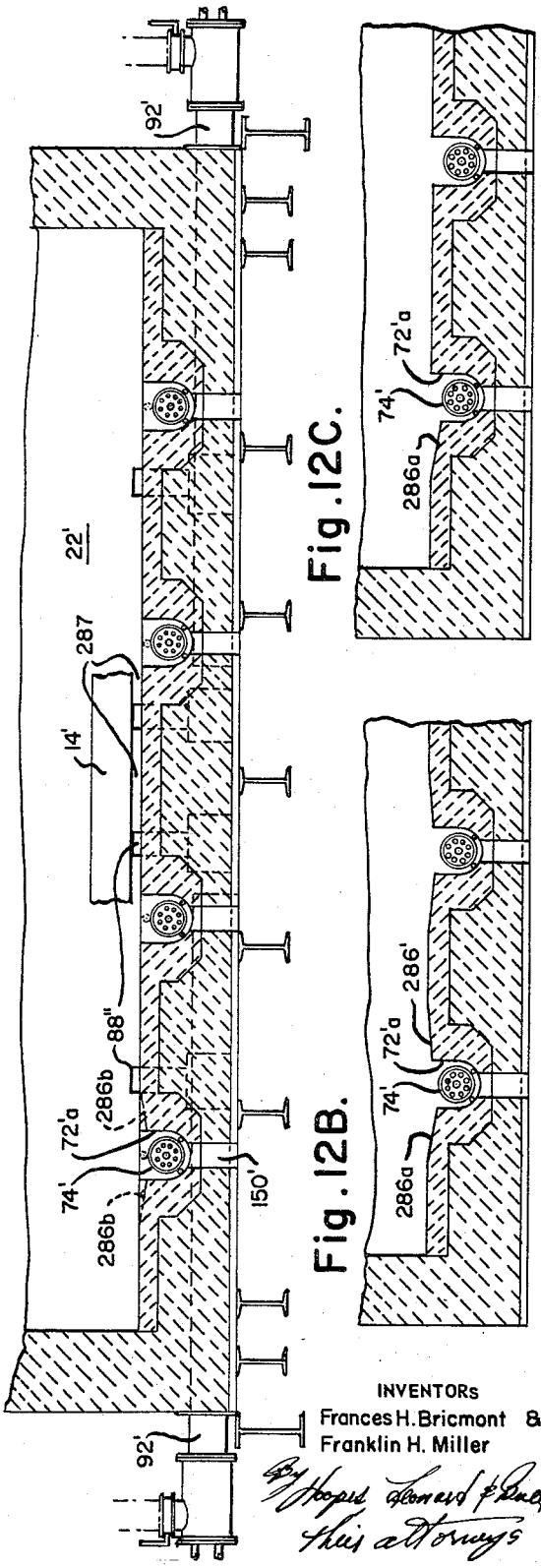

United States Patent Office 3,387,834
Patented June 11, 1968

3,387,834
HEARTH FIRING APPARATUS
Frances H. Bricmont, Mount Lebanon Township, Allegheny County, and Franklin H. Miller, Levittown, Pa., assignors to Bloom Engineering Company, Inc., Pittsburgh, Pa., a corporation of Pennsylvania
Filed Mar. 21, 1966, Ser. No. 535,763
16 Claims. (Cl. 263—6)

ABSTRACT OF THE DISCLOSURE

Hearth firing apparatus is disclosed for eliminating "downtailing" if a steel slab or the like is passed through a hot rolling mill system. The invention also is directed to removing the end rolling effects associated with the end portions of the workpiece At the same time the colder skid marked areas imparted to the workpiece by cooled skid rolls are removed by direct firing in the firing troughs, which are provided with cleaning means and temperature controlling means.

---

The present invention relates to apparatus for heat treating steel and other metal articles and more particularly to heat-treating apparatus which can be installed in a high-temperature hearth or the like of a reheating or other heat-treating furnace.

The present invention constitutes an improvement upon Leon F. Conway Patent No. 3,081,073, entitled, Metal Heating Furnace Apparatus, and assigned to the assignee of the present application. The invention is particularly directed to removing or otherwise compensating for certain temperature differentials such as skid marks in heated steel slabs, billets, bars, blooms, ingots and other workpieces of the same or different metallic material. The heat-treating apparatus of the invention are also arranged for compensating for temperature drop or "downtailing" of the workpiece as it is moved through the sheet, plate or bar rolling mill and for the higher rolling forces required at the head and tail portions of the workpiece due to the absence of tensile forces which are normally present in intermediate areas of the workpiece as a result of engagement by adjacent stands of a close-coupled mill.

In the reheating or other heat-treatment of slabs, bilets, booms, ingots and other shapes of steel and other metals, the furnaces for such purposes usually support the work on longitudinally extending cooled supports known as skid pipes within the furnace. A typical reheating furnace for steel slabs, for example, may have a multizone heating area of about 60–90 feet in length and a soaking zone including a high-temperature or refractory hearth of 150–30 feet in length. The heating and soaking zones are arranged in tandem along the length of the furnace, with the soaking zone at the exit or discharge end. Within the heating zone or zones the workpieces are supported on laterally spaced skid pipes, which are maintained generally at the same elevation as the hearth, so that heat can be transferred to both the top and bottom surfaces of the workpieces from the upper and lower furnace heating zones. The present furnaces of the character described for steel workpieces are provided with two to six such skid pipes which are usually equally spaced transversely of the furnace and extend in a parallel array substantially along the length of the heating zone or zones. Larger furnaces presently under construction will utilize as many as eight or more such skid pipes.

The usual manner of advancing such workpieces, known as the steel charge in the case of steel workpieces, through the furnace is by pushing each entering workpiece into the entrance end of the furnace, which causes the entering workpiece to engage and push forward the workpiece bed which is already undergoing heating. The foremost workpiece in the line of workpieces is then discharged, in end-discharge type furnaces, at the exit end of the furnace contemporaneously with and by the entry of a new workpiece. In extractor unloading and discharging furnaces, a group of workpieces may be unloaded at intervals. Generally, such furnaces have a plurality of longitudinally spaced heating zones for the proper control of the workpiece temperature, with each zone being divided horizontally into upper and lower sections by the skid rails and the workpiece bed thereon. The soaking zone or section includes the aforementioned refractory hearth which is located adjacent the exit end of the furnace. The workpieces are pushed along the refractory hearth and are thermally soaked to mitigate temperature differentials, e.g., between surface and center or edges and center.

In the operation of the furnaces, a problem arises in that the areas of contact of each workpiece with the skid pipes of the heating zone of the furnace result in narrow, colder areas extending transversely across the workpieces. Such colder, longitudinally extending (relative to the long axis of the furnace) areas are known as skid marks and may extend vertically entirely through the thickness of the workpieces, which thickness in the case of steel slabs may vary between three and fourteen or more inches. At the bottom surface areas of the skid marks, the lowest temperature may be as much as 900° F. below the average temperature of the workpiece, while the skid mark temperature on the top surface of a steel workpiece in the neighborhood of eight inches thick may be in the neighborhood of 100 or more degrees lower than that of the surrounding surface area.

The skid marks, of course, result from contact of the workpieces with the aforementioned skid rails, and by thermal radiation thereto, which are usually cooled by a suitable coolant such as water in order to prevent their destruction in the heating area of the furnace. In most furnaces of the character described, the cooling water is maintained at an average temperature of about 100° F., and the resulting rather large temperature differential causes heat from the heated workpieces to be transferred rapidly to the skid rails by conduction and radiation.

Although the thermal soaking of the workpieces in the discharge portion of the furnace ameliorates temperature differentials associated with the skid marks to some extent, these cold streaks remain in the workpieces, and particularly in the case of steel workpieces, create a number of problems in the subsequent hot rolling mill or other fabricational equipment. As an initial consideration, the presence of the cold streaks or skid marks in many cases results in overheating the workpieces in an attempt to bring the skid marks up to a minimum rolling temperature. Even with such overheating, an excessive amount of power is consumed by the rolling stations as they successively engage the skid marks extending transversely of the slab or billet. This results in periodic overloads on the rolling mill motors and attendant shortening of their useful lives. It also forces the rolling mills to be operated at less than maximum capability in order to prevent opening of protective circuit breakers and the loss of a slab or billet in the mill. The periodic overloads as the skid marks pass through the stands also results in excessive mechanical abuse and an attendant maintenance requirement for other components of the mill.

When rolling strip, the presence of skid marks results in excessive gauge variations, and frequently the temperature differential of the skid marks is large enough to result in work hardening or "blown grain" at the areas of the skid marks, which in turn may result in holes and breaks requiring rejection of the coil. Still more undesirable, are areas of undetectable brittleness in the sheet at the areas of the skid marks which do not become apparent until fabrication by the customer. The aforementioned gauge variation of the sheet is compensated for, to some extent, by the installation of automatic gauge controls on the strip mill which, however, not only requires excessive action due to the numerous skid marks and resulting mechanical abuse to the rolling mill, but also results in frequent peak motor loads.

The differential temperature associated with skid marks and the fact that the remainder of the slabs must be overheated in order to compensate partially for the presence of the skid marks have resulted in variable metallurgical and physical properties in the end products rolled or otherwise fabricated from the workpieces. For example, it has been difficult to control hardness, ductility, formability and grain structure within the finished product.

Another disadvantage of the presence of skid marks resides in the fact that insufficient scale forms on the areas of the skid marks. The presence of an adequate amount of scale, which usually forms on the outer portions of the workpieces, is beneficial in removing scabs, scarfing, flashing and other surface defects from the workpieces at the descaler.

Finally, it should be pointed out that certain metals and metal alloys cannot at the present time be accommodated by the hot rolling mill, owing to the necessity of operating closer to maximum or minimum finished temperatures than is now feasible as a result of the presence of the aforementioned skid marks.

A number of proposals have been advanced heretofore in an attempt to eliminate or mitigate the effects of skid marks. For example, it has been proposed to permit the workpieces to remain for longer periods of time within the soaking zone of the heat-treating or reheating furnace. This arrangement, however, if effective at all, would greatly reduce furnace productivity and therefore would involve a disproportionate cost from loss of production. It has also been proposed to construct the furnaces with longer hearths which would effectively increase the time during which each workpiece remains in the soaking zone. The size and expense limitations of such a furnace, in order to permit even a partial removal of skid marks, would not justify the cost of its installation. Moreover, the length of the furnace is limited to about 25 feet per inch of thickness of the thinnest workpieces to be pushed therethrough without buckling. Thus, for the usual three or four inch slabs, the furnace length is limited to about 75 or 100 feet, respectively.

It has been proposed to "walk" the workpieces through the furnace by the provision of suitable lifting mechanisms so that the workpieces are not in continuous sliding contact with the water-cooled skid pipes. The high initial cost and subsequent maintenance requirements of such lifting mechanism, particularly for operation in a high-temperature environment, would not justify its installation in most applications. Moreover, the lifting mechanism would require water-cooling parts thereof which engage the workpieces and which would leave similar marks.

Another proposal involves changing the skid pipe geometry such that the same areas of each workpiece are not in contact with the skid pipes throughout the length of the heating zone or zones. It has been shown, however, that a staggered arrangement of skid rails, while perhaps reducing the temperature differentials associated with the skid marks, merely multiplies the number of skid marks. Moreover, the number of expensive coolant connections would be greatly increased, and the arrangement would be subject to considerable and accelerating wearing due to the mechanical strains at the crossover areas in the staggered array of skid rails. The workpieces also would be supported asymmetrically, at least in some areas of the furnace, with the result that their sliding movements would be difficult to control, particularly in a two-skid furnace.

It has also been proposed to raise the average coolant temperature of the skid pipe. However, taking an extreme case for purposes of illustration wherein the average coolant temperature is raised from 100° F. to 900° F., it has been shown mathematically that the temperature differentials of the skid marks would be reduced only about 40% under ideal conditions and neglecting radiational heat transfer. In actual practice the reduction would be much less.

Another proposed solution involves placing heating tubes within the soak-zone hearth structure and below the surface thereof in alignment with the skid marks the workpieces passing thereover. In this arrangement the refractory material of the hearth may transfer heat in the order of 600 B.t.u. per lineal foot of skid mark, whereas the heat requirement for complete skid mark removal in many cases is about 30,000 B.t.u. per lineal foot.

Finally, it should be pointed out that another possibility is the replacement of the water-cooled skid pipes with a skid structure fabricated from a heat-resistant alloy. For example, an alloy is available which would be capable of withstanding temperatures of up to 2400° F. At these extreme temperatures, however, the useful life of such skids would not justify their installation, and, moreover, it is necessary for most hot rolling applications to steel fabrication as practiced in this country, to heat the workpieces in a furnace wherein heating zone temperatures of 2450° F. to 2550° F. are maintained.

The foregoing difficulties associated with the presence of skid marks, which have persisted since the advent of multi-zone heat-treating and reheating furnaces, are basically overcome by the apparatus described and claimed in the aforementioned Conway patent, on which the present application is an improvement. However, in order to operate the firing troughs, forming part of the disclosed hearth firing apparatus, on a continuous basis over extended periods of time, it is essential to provide means for maintaining the troughs relatively free of accumulated slag, scale and other debris, without shutting down the furnace. It is also necessary to provide means for accurately measuring and controlling trough temperatures to prevent overheating the workpieces, the pooling of molten slag or other debris, or the destruction of the trough cleaning means, temperature sensing means, and other control equipment that may be employed as part of the hearth firing apparatus. For most applications among which are many in the steel industry, the maximum practical trough operating temperature is in the neighborhood of 2350° F. The specific improvements associated with this aspect of the invention include the provision of several forms of trough cleaning means, means for closely controlling the trough temperatures for purposes inter alia of preventing the pooling of molten slag in the troughs, and improvements in burner structures useful in firing the hearths and adapted in certain forms thereof for extending the burner flames along the length of long firing troughs to provide more even heating thereof. These improvements will be discussed presently in general terms and subsequently in greater detail with reference to the drawings.

Another problem which arises in the heat-treating and hot rolling of workpieces, particularly when a close-coupled strip mill or the like is involved, are the end rolling effects which are associated with each end portion of the workpiece, such as strip or the like, as it is moved through the mill. It is well known that a greater rolling force is required at the head and tail portions of the strip than is required for rolling the intermediate portions thereof. The head and tail strip portions are defined by the distances between adjacent mill stands. As the ends of the strip pass through the close-coupled mill, the head and tail portions thereof are not always under the usual tension of a close-coupled mill. Thus, such tension is applied only to one side of a given stand, when a non-tensioned head or tail portion of the strip lies on the other side of the stand, and the rolling force of such stand must be increased until the end of the strip reaches the next succeeding stand, or after it leaves the next preceding stand, as the case may be. As pointed out above, it is, of course, desirable to operate the hot rolling mill with as little change in applied rolling forces as possible in order to minimize the mechanical abuse absorbed by the mill, and for the other related reasons mentioned above. A similar problem is the increased load or impact load as the front end of the workpiece engages each succeeding stand of a hot rolling mill.

These problems are overcome by another feature of the disclosed apparatus, which provides means for heating the head and tail portions of the workpieces to slightly higher temperatures than that of the intermediate portions in order to compensate the end rolling effects.

Another problem associated with the hot rolling mill, particularly in the steel industry, involves the decreasing rolling temperature at a given mill stand as the tail end of the slab moves toward and through the stand. This is more commonly known as "downtailing" and involves an increasing rolling force applied by the given mill stand to compensate for the decreasing temperature of the workpiece moving therethrough. Downtailing, like the end-rolling effects, also prevents operating the rolling mill at its maximum capacity in order to prevent overloading the motors when rolling a workpiece at or near its tail end. It may be pointed out, too, that the undesirable effects of downtailing and the end rolling effects are cumulative at the tail end portion of the workpiece.

The last-mentioned problem is overcome by still another feature of the disclosed apparatus which provides means for gradually increasing the temperature of the workpieces toward the tail ends thereof in order to compensate for downtailing. Where both the end-rolling and downtailing compensational features of the invention are utilized, the aforementioned head and tail portions of the workpiece are heated about 25–50° F. higher than the adjacent portions respectively of the intermediate workpiece area. Thus, the tail portion of the workpiece will be heated about 25° F. to 50° F. higher than the head portion thereof, which difference in temperature represents the temperature increase or differential temperature between the ends of the intermediate workpiece area.

In overcoming the aforedescribed problems, the invention provides hearth burner apparatus and accessories and associated configurations of the high temperature hearth for use in the aforementioned heat-treating or reheating furnace. The hearth firing arrangement includes a number of troughs formed in the hearth in a laterally spaced, generally parallel array with the troughs being in longitudinal alignment with the skid rails of the furnace. A burner structure is mounted for firing through each of the troughs, and in accord with one feature of the invention, fluid actuated means are mounted in the trough for maintaining the trough free of accumulated scale and other undesired material. The fluid actuated means can be fixedly mounted within each trough, or alternatively a novel movable cleaning structure arranged in accordance with the invention can be provided for insertion into and withdrawal from the troughs, or alternatively a combination of fixed and self-actuated or otherwise movable, fluid actuated cleaning means can be employed. Air, waste steam, or other fluid can be conveniently employed in the fluid actuated means.

In one firing arrangement of the apparatus, the fuel fired into the troughs can be provided with excess combustion air to provide an oxidizing atmosphere within the troughs under the workpieces to form a desired amount of scale on the skid mark areas in addition to equalizing the temperature differentials associated therewith. In another arrangement, the fuel supplied by the burner structures can be initially provided with deficient combustion air and the requisite additional combustion air can be admitted to the troughs at one or more points along the length thereof either by said pneumatic means or by other secondary combustion air injection means. The burner flames are thus prolonged substantially along the length of the troughs for more efficient heating of the workpieces at the respective skid marks of the latter. In still another arrangement of the apparatus, the burner structures are supplied by a unique manifold arrangement through which the fuel lines are extended in order to provide the necessary cooling for the latter in the high temperature environment of the hearth.

The trough burner structures can be located either at the forward end portions of the troughs, i.e., adjacent the last heating zone of the furnace, or at the rearward end portions of the troughs at the delivery knuckle of the furnace. In the first case, the troughs can open through the delivery side of the furnace so that the burner exhaust gases are exhausted into the soaking zone of the furnace. In the second case, the troughs can open through the lower heating burner wall of the furnace for exhaust into the heating zone. In the absence of other governing considerations, the former arrangement is desirable in some cases as the trough temperatures will be roughly equal to the soaking zone temperatures or slightly higher and therefore can contribute more effectively to the heating requirements of the soaking zone rather than to those of the heating zone.

When the apparatus is provided with the aforementioned pneumatic means, it is contemplated that one or more cleanout hoppers, which can be opened by manually or mechanically operated means if desired, be provided to collect the scale and other debris moved along the troughs by the pneumatic means. Alternatively, when the burner structures can be located at the delivery knuckle or exit end of the troughs and at the other ends of the troughs, the latter can open directly into the adjacent heating zone of the furnace, in which case the hoppers can be eliminated.

Other features of the apparatus include the use of independent temperature-sensing means in each trough which are coupled to remotely actuatable valve means in each of the fuel lines for the burner structures in order to closely control the heating temperatures in all of the troughs, to prevent melting and pooling of slag therein which would be exceedingly difficult to remove. In certain applications, the trough temperatures are maintained at a level such that the slag melts only to the extent that relatively small droplets or beads are formed, which can be readily removed from the troughs by the trough cleaning means of the invention. In accord with one feature of the invention, the temperature controlling means is operated to permit increasing temperatures in the troughs, laterally of the furnace and toward the tail ends of the workpieces to compensate at least partially for the aforesaid downtailing of the workpieces in the hot rolling mill.

When the firing troughs are operated at respective, differential temperatures, e.g., to compensate the aforementioned downtailing effects in the hot rolling mill, further compensating means includes portions of the hearth surface adjacent one or more of the troughs, which are beveled or inclined downwardly to the upper lateral edges of the trough in order to supply a minor proportion of the trough heat to the areas of the workpieces between the skid marks. This arrangement facilitates the provision of a uniformly increasing temperature extending along the length of the workpieces toward the tail ends thereof. Where more than one such inclined surface area is provided, the same can be inclined at differing angles in order to provide differing amounts of heat to such intermediate workpiece areas.

In order to overcome the problem associated with the end rolling effects, it is contemplated that the hearth surface can be beveled along at least a portion of the length of the outermost troughs. The aforementioned beveled portions lie adjacent the outer lateral edges respectively of the trough openings, and can be inclined at a different angle if the downtailing compensating feature of the apparatus is employed therewith and includes intermediate, beveled hearth surfaces.

In a specific example, a pair of co-extending beveled hearth surface portions can be formed adjacent the lateral edges respectively of each firing trough. The outwardly disposed beveled surface of each outermost firing trough, i.e., at an associated lateral edge of the hearth, can be provided with greater angles of inclination than those of the intermediate beveled portions in order to compensate in addition for the aforementioned end rolling effects.

The width and depth of the firing troughs will vary depending upon the structural and operational details of a given furnace and particularly of the skid rails therein. For purposes of illustration only, however, the width of the troughs can be established so as to cover in the neighborhood of 500° F. temperature differential on each side of the coldest portion of the skid mark. In many applications a sufficient width for this purpose varies between eight and twelve inches. The firing troughs, in addition, can be provided with a similar depth dimension in order to provide adequate passage for the hot combustion gases.

These and other objects, features and advantages of the invention will be elaborated upon during the forthcoming description of certain presently preferred embodiments of the invention together with presently preferred methods of practicing the same.

In the drawings we have shown certain presently preferred embodiments of the invention together with certain presently preferred methods of practicing the same, wherein:

FIGURE 1 is a longitudinally sectioned view of a typical reheating furnace for steel slabs and the like and illustrating one application of the invention. Parts are removed and other parts are broken away in order to illustrate the invention more clearly;

FIGURE 1A is an enlarged cross-sectional view of a cooled skid pipe such as used in the furnace of FIGURE 1;

FIGURE 2 is a schematic and graphic representation of the location of a typical steel slab with reference to the skid rails and the temperature drops associated therewith;

FIGURE 3 is an enlarged isometric view, partially in section and partially broken away, of the hearth section and adjacent components of the furnace shown in FIGURE 1;

FIGURE 4 is a longitudinally sectioned view of the hearth firing apparatus and taken generally along reference line IV—IV of FIGURE 3;

FIGURE 5 is a cross-sectional view of the apparatus shown in FIGURE 3 and taken along reference line V—V thereof;

FIGURE 6 is a longitudinally sectioned view of hearth firing apparatus similar to that shown in FIGURE 4 but illustrating an alternative arrangement of the trough cleaning apparatus;

FIGURE 9A is a longitudinally sectioned view similar to that shown in FIGURE 4, but utilizing another form of the novel burner apparatus of the invention and combining the trough cleaning arrangements of FIGURES 4 and 8;

FIGURE 12 is a cross-sectional view of a hearth firing arrangement similar to that shown in FIGURES 3 and 5 but illustrating auxiliary hearth firing means which can be associated with one or more of the firing troughs of the hearth firing apparatus of the invention;

FIGURE 12A is a cross-sectional view of a modified form of the auxiliary hearth firing means, arranged in this example for also supporting the workpieces on the hearth;

FIGURE 12B is a partial view similar to that of FIGURE 12 and showing another arrangement of the auxiliary hearth firing means shown therein;

FIGURE 12C is a partial view similar to that of FIGURE 12 and showing another arrangement of the auxiliary hearth firing means shown therein;

FIGURE 13 is an enlarged, partial, longitudinally sectioned view of the movable jet structure such as that shown in FIGURES 3, 4 and 7 of the drawings;

FIGURE 14 is a cross-sectional view of the apparatus shown in FIGURE 13 and taken along reference line XIV—XIV thereof;

FIGURE 15 is a longtiudinally sectioned view of another modification of the movable jet structure;

FIGURE 16 is an enlarged cross-section view of the apparatus shown in FIGURE 15 and taken along reference line XVI—XVI thereof;

FIGURE 18 is a schematic electrical circuit diagram illustrating one arrangement according to the invention for sequentially operating the pneumatic cleaning means of the hearth firing apparatus.

Figure 7:
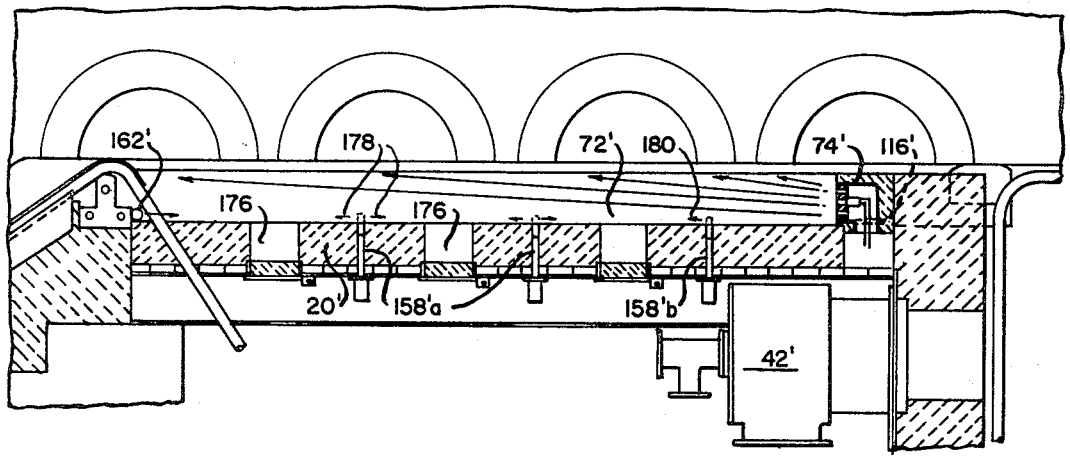
FIGURE 7 is a longitudinally sectioned view of hearth firing apparatus generally similar to that shown in FIGURES 3 and 4, but illustrating still another arrangement of the hearth cleaning apparatus.

Referring now to FIGURE 1 of the drawings, an illustrative furnace 10 is illustrated, in which the apparatus of the invention is shown schematically. The furnace 10 in this example is a typical reheating furnace for heating steel slabs or billets or the like before passage through a subsequent hot rolling mill (not shown). The furnace 10 includes an entrance 12, through which steel slabs 14 or other workpieces are pushed, with the slabs 14 forming a "steel charge" 16 extending substantially along the entire longitudinal dimension of the furnace 10. The charge 16 is supported during its passage through the furnace on a plurality of supports or skid pipes 18 in the heating zone or zones of the furnace and on a high-temperature hearth 20, disposed at the same elevation as that of the skid pipes relative to the base 21 of the furnace in the soaking zone 22 of the furnace. The charge 16 and the skid pipes 18 thus divide the furnace into upper and lower heating zones 24 and 26, respectively.

A number of soaking burners 28 are mounted in the discharge wall 30 of the furnace 10 for supplying heat to the soaking zone 22. The hot gases from the burners 28 travel past the discharge knuckle 32 and toward the soak zone nose 34 which is defined by the upper furnace end wall 36 and the sloping soaking zone roof portion 38. The soak zone roof structure can be provided with burners to supply heat to the upper surfaces of the charge, if desired, as described in Frederick S. Bloom Patent No.

3,100,811 issued Aug. 13, 1963, entitled "Metal Heating Furnace"; or in the copending, co-assigned James E. Hovis application entitled "Skid Mark Removal Apparatus," filed April 5, 1966, Ser. No. 540,344. A number of upper and lower heating burners 40 and 42 are mounted respectively in the upper end wall 36 and in lower end wall 44 for firing respectively into the upper and lower heating zones 24 and 26. The hot combustion gases from the burners 40 and 42 flow over and under the steel charge 16 to the charging end of the furnace 10 where they are collected and discharged through the flue duct 46.

The steel charge 16 is moved through the furnace 10 by successive slabs or other workpieces pushed into the entrance 12, which action displaces the endmost workpiece of the steel bed at the discharge end of the furnace 10 such that it engages drop out slope 48 and is discharged through exit opening 50 of the furnace. Depending upon the specific application of the invention, the metal heating furnace may be provided with side discharge or extractor unloading (not shown). In most furnaces of this type a longitudinally extending series of observation ports or doors 49 are formed in the furnace side walls 51 and positioned adjacent the lateral edges of the steel bed 16 to provide maintenance access to the furnace and also visual access for inspection by the heater or other furnace operating personnel. Other structural details of the furnace are described more fully in the aforementioned co-assigned Conway Patent No. 3,081,073.

With reference now to FIGURE 1A, the structural details of a typical cooled skid pipe or rail are illustrated. In most cases the skid pipe 18 is fabricated from a steel supporting pipe or conduit 52 through the inner opening 54 of which is circulated a suitable coolant such as water. A thermal insulation material 56 can be formed for example from plastic alumina and is extended substantially completely around the skid pipe 52. A steel rod or wear strip 58 is welded along the top surface of the steel pipe 52 on which the steel charge 16 rests and slides. It will be seen, then, that the steel workpieces have a very narrow contact area with the skid pipes 18.

However, such contact, due to the extremely high temperature differentials involved, maintains a decided cold spot or skid mark at the contact areas as illustrated in FIGURE 2. In accord with present understanding, heat is transferred rapidly from the skid marks to the skid pipes by both conduction and radiation. In FIGURE 2, temperature curve 60 represents the bottom surface temperature of a workpiece 14 as the latter reaches the soak zone hearth 20 where it leaves the skid pipes 18. The other temperature curve 62 similarly represents the upper surface temperature of a typical workpiece. The negative peaks 64 of the bottom temperature curve 60 represents the maximum surface temperature drops associated with the skid marks produced by the skid pipes 18 on the bottom surfaces of the workpieces. The similarly located temperature dips 66 of the upper surface temperature curve 62 show that the skid marks 68 in the workpiece 14 extend entirely through the thickness thereof. The widths of the skid marks 68 are relatively narrow in the longitudinal direction of the workpieces. In most cases, the major proportion of the temperature drop associated with the skid marks 68 is represented by an area of only about 8 to 12 inches in width as denoted by reference character 70.

Returning again to FIGURE 1 of the drawings, the soak zone hearth 20 is provided with a number of relatively narrow firing troughs 72 with burners 74 therein for applying heat to the steel charge 16 directly below the skid marks 68.

In this arrangement of the invention, four such firing troughs 72 are employed, which are longitudinally aligned with the skid rails 18 as is more readily apparent from an inspection of FIGURE 5 of the drawings. The firing troughs 72 therefore are disposed directly beneath the skid marks 68 (FIGURE 2) which are most prominent on the under surfaces of the steel charge 16. It will be understood of course that a greater or lesser number of firing troughs 72 can be employed, which of course will be equal to the number of skid pipes 18 utilized in a given furnace.

In accordance with the several features of the apparatus, additional means are associated with the hearth 20 for supplying and controlling the fuel and combustion air for the burners 74, for cleaning the troughs 72, for removing the debris thus collected from the hearth 20, for individually controlling the combustion temperatures in the troughs 72, and for supplying limited amounts of heat from said troughs to workpiece areas between the skid marks thereof in order to provide increased end temperatures or a uniformly increasing temperature along the length of the workpieces or both.

Referring now to FIGURES 3-5 of the drawings, an exemplary arrangement of the apparatus according to the invention is illustrated therein in greater detail. In this arrangement, as better shown in FIGURE 3, the soak zone hearth 20 is supported upon a plurality of transversely extending channel irons 76 which in turn are supported upon a plurality of parallel, spaced, longitudinally extending I-beams 78 with the beams 78 being in turn supported by the lower furnace end wall 44 at their charge ends and at their discharge ends upon supporting wall 80 forming part of the drop-out structure 48.

In a typical installation, the hearth 20 is built up from a bottom layer 82 of insulating firebrick laid directly upon the channel irons 76, an intermediate layer 84 of first-quality or high-temperature firebrick and a facing layer of continuous or plastic refractory 86. The plastic refractory layer 86 varies from 4 to 6 inches in thickness and is employed also in this example to line the troughs 72 as denoted by reference characters 86a. The high-temperature firebrick layer 84 is about 7-8 inches in thickness except adjacent the troughs 72, and the insulating firebrick layer 82 is about 10 inches in thickness.

As the workpieces 14 are pushed across the hearth 20, they rest and slide upon a plurality of rows of dry skids 88 which are usually formed from strips of steel or the like embedded edgewise in the masonry structure of the hearth 20. As better shown in FIGURE 12A, the dry skids 88 in certain applications of the apparatus desirably project an inch or an inch and a half above the surrounding hearth area to facilitate sliding thereover and to permit a portion of the heat from each trough to be applied to the areas between the skid marks 68 in order to aid in compensating for the aforementioned end-rolling and downtailing effects as described more fully hereinafter. In this arrangement the rows of skids 88 are disposed adjacent the firing troughs 72 respectively. At the discharge end of the hearth 20 a subsequent addition of a workpiece at the entrance end 12 (FIGURE 1) of the furnace causes the end workpiece 14a to pass over the drop-out knuckle 32 whereupon it engages the drop-out skids 90. The skids 90 also are water-cooled and can be otherwise constructed as the skid rails 18. However, the residence time of the delivered slab or workpiece thereon is insufficient to leave skid marks as a result of contact with the rails 90.

As noted previously, each of the firing troughs 72 is provided, in this example, at its charge end with a burner structure 74. In accordance with one arrangement of the invention for supplying primary combustion air and fuel, a pair of the burners 74 are so supplied by a combined air and fuel line manifold assembly denoted generally by reference character 92. The manifold 92 is provided with air and fuel fittings 94 and 96 respectively. The other pair of burners 74 are similarly supplied with a manifold 92 having its air and gas fittings (not shown) disposed at the opposite side of the hearth 20. The manifold 92 is described hereinafter in greater detail in connection with FIGURE 11 of the drawings. It will also be apparent that a single manifold 98, such as that described hereinafter with reference to FIGURE 11A, can be substituted for the pair of manifolds 92.

It is contemplated, of course, that a number of suitable burner constructions can be employed with the firing apparatus of the invention. A suitable form of burner construction, arranged in accordance with the invention, is illustrated more fully in FIGURES 4, 5 and 11 of the drawings. In this arrangement, the burner 74 includes an L casting 100 fabricated from a heat-resistant alloy such as a high temperature stainless steel and having a firing port 102, and a mixing baffle 104 provided with air passages 106 and a central opening through which fuel nozzle 108 is extended. The nozzle 108 is supplied by fuel line 110 which is supported partly by the nozzle 108 and baffle 104 and partly by means presently to be described. The fuel line 110 is supported substantially concentrically of the lower opening of the casting 100 to form an annular combustion air passage 112.

The burner construction is provided with a heat-resistant casing 114, preferably molded about the casting 100 and formed from a plastic refractory material.

As better shown in FIGURE 5, a pair of jet passages 116 for a suitable pressurized fluid such as air or waste steam extend longitudinally through the refractory casing 114 and open on the face thereof adjacent the bottom surface of the trough 72. The jet passages 116 are supplied with the aforementioned fluid by high pressure header 118 which passes transversely through the front portion of the hearth 20 and in this example through the molded jackets 114 of the burner structures 74. The air streams from the passages 116 are utilized to clean the adjacent portion of the trough 72 as described hereinafter more fully.

Figure 11A:
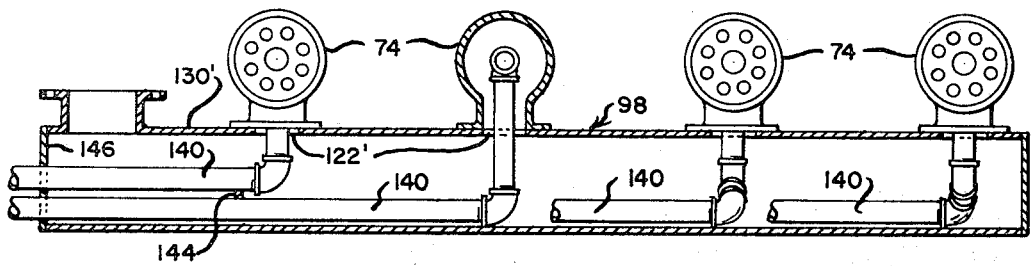
FIGURE 11A is a longitudinally sectioned view of another form of combined fuel and combustion air header arrangement, similar to that shown in FIGURE 11.
Figure 11:
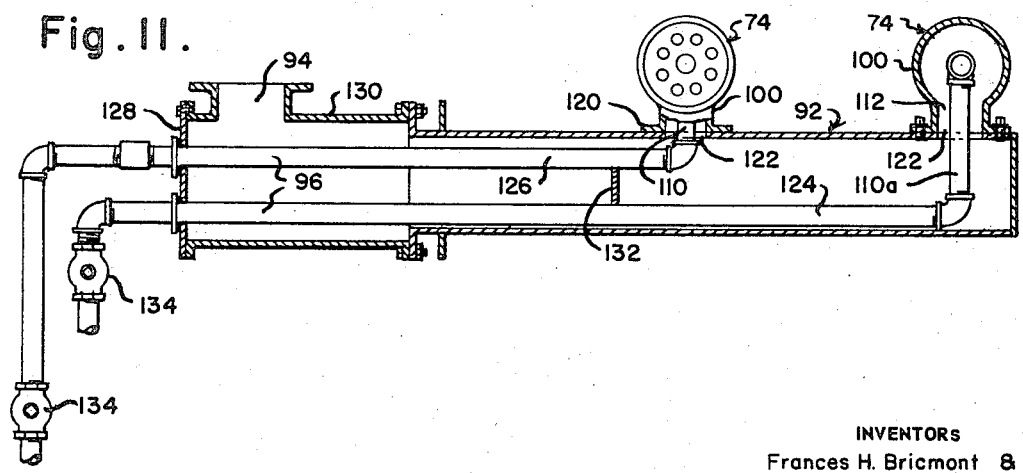
FIGURE 11 is a longitudinally sectioned view of the combination air and fuel header shown in FIGURE 3 and taken generally along reference line XI—XI thereof.

Each burner casting 100 is provided at its lower end with a mounting flange 120 whereby, as better shown in FIGURE 11, a pair of the burners 74 are mounted on the upper surface of each air and gas manifold 92. The upper side of the manifold 92 is provided with a pair of air outlets or openings 122 which are thus disposed in registration with the outer peripheries of the annular air passages 112 respectively of the burners 74. The fuel lines 110 of the burners 74 are respectively coupled to fuel supply conduits 124 and 126, with the fuel line 110a of the right hand burner as viewed in FIGURE 11 being longer for this purpose as the fuel conduits 124 and 126 are supported on different elevations within the air manifold 92. The fuel conduits 124, 126 are thus supported by end air closure 128 of an air fitting 130 and by a vertical spacer plate 132 welded or otherwise secured between the fuel conduits 124, 126. The conduits 124, 126 aid in supporting the fuel lines 110 of the burners 74. The combustion air flowing through the manifolds 92 prevents overheating of the manifold structure and particularly of the fuel conduits 124, 126 therein.

As noted previously and as better shown in FIGURE 5 of the drawings, a pair of the manifolds 92 are utilized in this arrangement of the invention with each manifold 92 having respective air and gas connections at the adjacent side of the hearth 20. Each pair of fuel conduits 124 or 126 are provided with individual valves 134. The four valves 134 can be manually adjusted or remotely by means presently to be described, in order to adjust the temperature of each of the firing troughs 72. Suitable valve means also can be mounted in the air supply conduits 136 coupled to the manifolds 92, respectively.

In one operating method of the invention, a stoichiometric amount of air can be supplied to each manifold 92, which is equivalent to the maximum fuel consumption of the associated pair of burners 74. Flame temperature adjustments can then be made from a normal fuel flow, which is less than the maximum fuel capacity, by supplying more or less fuel to each burner 74 by appropriate individual adjustment of the associated pair of valves 134. This tempered flame adjustment normally results in varying amounts of excess combustion air at the burners 74, and is satisfactory for most applications.

As more clearly shown in FIGURES 3–5 of the drawings, each manifold 92 is substantially embedded within the masonry structure of the hearth 20 where it rests upon the adjacent channel irons 76. With this arrangement, the manifold 92 is supported above and out of the way of the heating burners 42 which are mounted in the lower end wall 44 of the furnace 10. The combustion air flowing continuously through the manifolds 92 serves to maintain the manifold structure and particularly the fuel conduits 124 and 126 supported therein at tolerable temperatures. The fuel lines 110 and gas nozzles 108, are cooled by conduction and also by convection from the combustion air flowing therearound. The burner castings 100 are similarly protected by being secured to the manifolds 92 in good heat transfer relationship by virtue of their mounting flanges 120 and also by the combustion air flowing therethrough. Thus, the burners 74, their fuel lines, and the walls and associated components of the manifolds 92 are protected by the cooling effects of combustion air flowing through or around these components as the case may be.

In FIGURE 11A of the drawings, a single manifold arrangement 98 is illustrated, which has been alluded to previously. The latter manifold extends substantially across the width of the hearth 20 and in this arrangement is provided with air openings 122′ and associated means for mounting all of the burners 74 which are secured to the upper wall of the manifold 98 as described with reference to the manifolds 92. Save for its longer length, the manifold 98 is otherwise similarly constructed with the exception that, in this case, four fuel conduits denoted generally by reference characters 140 are extended various distances into the manifold 98 as determined by the respective locations of the burners 74. The three longer fuel conduits 140 rest upon the bottom wall 142 of the manifold 98 while the shortest conduit, in this example, is supported by a relatively short stabilizer plate 144 and end closure 146 of the air fitting 130′. When thus mounted the burners 74 are disposed for directing hot combustion gases longitudinally of the associated firing troughs 72 and generally upwardly against the adjacent under surface of the steel charge 16 as denoted by flow arrows 148 (FIGURE 4).

With more particular reference again to FIGURES 3 and 4 of the drawings, one arrangement for removing scale, slag and other foreign material from each of the firing troughs 72 is illustrated therein. In order to facilitate such removal, as better shown in FIGURE 3 of the drawings, each of the troughs 72 is provided with a generally rounded bottom structure. In this example, a single cleanout opening 150 is provided in each of the troughs 72 adjacent the discharge end thereof. The cleanout openings 150 extend vertically through the masonry portion of the hearth 20 where they communicate respectively with boxed openings 152 cut in the adjacent channel irons 76. The openings 152 are provided with bottom, hinged covers 154 which can be manipulated by a suitable operator such as air cylinder 156. Each of the covers 154 are provided on their upper surface with a refractory layer 157 to protect the covers 154 from the hot scale and slag blown into the openings 150. It is also contemplated that each of the boxed openings 152 can open directly into a transversely extending flue duct or the like (not shown) supported directly beneath the openings 152. A blast of air can be then sent periodically through the duct-work by suitable means (not shown) to remove the debris collected therein from the cleanouts 150–152.

The area of each trough 72 between its cleanout openings 150 and a point adjacent the associated burner 74 is periodically swept clean in this example of the invention by pneumatic or other fluid actuated means including a plurality of jet structures denoted generally by reference characters 158. Air, steam or other suitable fluid under pressure can be passed through the jet structures 158 for the purposes of the invention. The jet structures 158 desirably are arranged to extend upwardly or pop-up into the trough 72 when pressurized air or other fluid is supplied thereto and then to drop automatically to their recessed positions when the air or other fluid supply is cut off. One arrangement of a suitable pop-up jet structure 158 is described hereinafter in greater detail with reference to FIGURES 13 and 14 of the drawings. Other means operated independently of the pressurized fluid supply can be used to extend and withdraw the jet structures 158.

In the present arrangement, five such jets 158 are utilized and each is extended through a generally tubular refractory plug 160 which in turn extends upwardly through closely fitting apertures through the hearth 20 to the bottom surface of each firing trough 72. The refractory plugs 160 can be fabricated from plastic alumina in order to provide additional heat insulation for the air jets 158. The plugs 160 also facilitate removal or replacement of the associate jets 158, in that the plugs can be broken out and replaced without damaging the jets 158 or deforming the closely fitting hearth apertures. It is contemplated in accordance with the invention that the air jets 158 can be energized simultaneously, or more desirably in sequence to provide more uniform cleaning and to conserve compressed air or other pressurized fluid. It is also contemplated that the jet operation of the respective firing troughs 72 also can be accomplished in a sequential relationship to conserve compressed air still further. In one sequencing arrangement, the jets 158 of each trough 72 can be energized in sequence starting from the jet nearest the cleanout opening 150 and proceeding toward the associated burner 74 and thence in return sequence back toward the cleanout opening 150. Suitable circuitry arranged in accordance with the invention for effecting such sequencing operation is described more fully below in connection with FIGURES 17 and 18 of the drawings.

That portion of each firing trough 72 between the associated burner 74 and the adjacent pop-up jet 158 is cleaned by the aforesaid jets 116 associated with the burner jacket 114. At the opposite ends of the firing troughs 72, that portion between the drop-out knuckle 32 and the cleanout opening 150 is swept clean of debris by one or more fixed jets denoted generally by the reference character 162.

With reference to FIGURE 6 of the drawings, another fluid actuated trough-cleaning arrangement of the invention is illustrated, which is generally similar to that shown in FIGURES 3 and 4 with the exception that the pop-up jets 158 are replaced by fixed jet structures 164. Although the same number of fixed jets 164 are illustrated, it will be readily apparent that a greater or lesser number can be utilized depending upon the length of the associated firing trough 72'. In this arrangement, each jet 164 is formed from a heat-resistant alloy tube 166 which is extended upwardly through a suitable aperture therefor extending through the hearth 20' to the bottom of the associated firing troughs 72'. In this example, the fixed jets 164 are spacedly arranged along the center line of the bottom of the troughs 72' as are the pop-up jets 158 (FIGURE 4). The fixed jets 164, however, normally project a short distance above the firing trough bottom as denoted by reference characters 168. These projecting ends 168 of the alloy tubes 166 are each provided with a jet aperture 170 from which streams of air are periodically directed as denoted by flow arrows 172.

In order to prevent scale and other foreign matter blown along the length of the firing troughs to the cleanout opening 150', from hanging up on the projecting ends 168 of the jet tubes 166 a ramp or incline 174 is constructed over and is extended upstream from each of the projecting tube ends 168. The upper surfaces of the ramps 174 in this example are planar and have a gentle slope to facilitate the blowing of debris thereover by the adjacent, upstream jet. The bottom surfaces of the ramps 174 are of arcuate configuration and are complementary with the adjacent surfaces of the trough bottom so that the ramp structures 174 seat flushly thereon. The gentle slopes of the ramps 174 also minimize impingement of the hot burner gases thereon. As seen in FIGURE 6, the projecting ends of the jet tubes 166 are substantially embedded in the ramp structure 174 which are constructed from a high-temperature resistant refractory material to prevent destruction of the ramps themselves and also to protect the projecting ends of the jet tubes 168 from the burner gases. As pointed out in connection with FIGURES 3 and 4 of the drawings, operation of the fixed jets 164 can be simultaneous or sequenced, as desired.

The pneumatic or other fluid actuated cleaning arrangement according to FIGURE 6, has the advantage of no moving parts, while the arrangement of FIGURE 4 eliminates the necessity of having upwardly extending projections in the trough bottom.

Referring now to FIGURE 7 of the drawings, another fluid actuated cleaning arrangement according to the invention is illustrated for use in firing trough 72'. In the latter arrangement of the invention, each firing trough 72' is provided with a number of cleanout openings 176 formed at spaced locations along the length of the hearth 20'. The cleanouts 176 are otherwise similar to the cleanout arrangement 150–156 of FIGURES 3 and 4 of the drawings. The use of multiple cleanout openings 176 are desirable in the case of relatively long firing troughs 72' or where scale and slag conditions are unusually severe. In the arrangement of FIGURE 7, the firing troughs 72 are provided at their ends with fixed jets 116' and 162' which are similar in construction and purpose to the similarly designated components of FIGURE 6. Intermediate the aforementioned fixed jets, the cleanout openings 176 are arranged in an alternating array with an equal number, in this example, of pop-up jets 158'a and 158'b. The pop-up jet 158'b is similar in construction to the pop-up jet 158 of FIGURES 3 and 4, while the jets 158'a differ therefrom in that they are provided with a pair of diametrically opposed jet openings, as noted below in the description of FIGURE 13, rather than with a single jet opening. Thus, when energized, the extensible portions (described below) of the intermediate pop-up jets 158'a (relative to the cleanout openings 176) eject streams of air or other pressurized fluid in opposite directions, as denoted by flow arrows 178, in order to blow debris along the bottom surface of the trough 72' and into the adjacent cleanout openings 176 respectively. On the other hand, the uni-directional pop-up jet 158'b, when energized, ejects a stream of air as indicated by flow arrows 180 only toward the endmost cleanout opening 176.

In the pneumatic or other fluid actuated cleaning arrangement of FIGURE 7, it is contemplated that the pop-up jets and the fixed jets will be energized simultaneously. The respective end portions of the troughs 72 are cleaned by the fixed jets 162' and 116' as described above. If desired, the pop-up jets 158'a and 158'b can be provided with the tubular plug members such as the plug members 160 described in connection with FIGURE 4.

Figure 8:
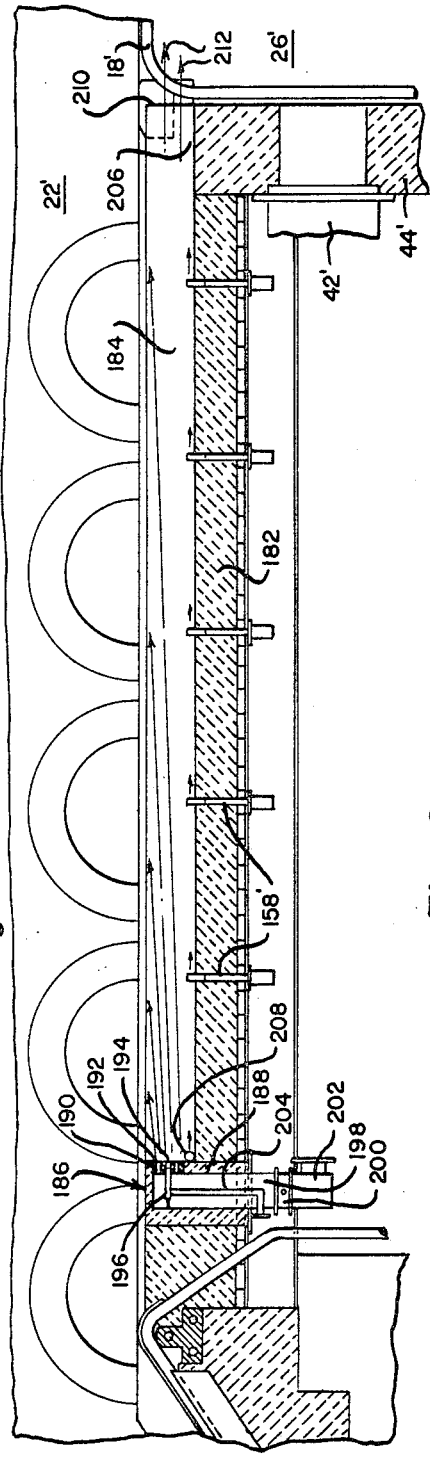
FIGURE 8 is a longitudinally sectioned view of hearth firing apparatus similar to that shown in FIGURE 4, but illustrating another arrangement of the burner and cleanout structures.

Referring now to FIGURE 8 of the drawings, another arrangement of the hearth heating apparatus of the invention, is illustrated therein. In the latter arrangement of the invention, a hearth 182, generally similar to the hearth 20 or 20' described above is provided with a number of longitudinally extending firing troughs 184. The troughs 184 likewise are generally similar to the firing troughs 72 or 72', but are provided in this arrangement with a burner strcture 186 mounted at the discharge knuckle end of each trough 184. It will be understood, of course, that the burner 74 or 74' can be used instead.

In this arrangement, the burner 186 is provided with an alloy body structure 188 having an air nozzle 190 mounted in an upper lateral opening thereof. The air nozzle 190 is provided with a suitable number of combustion air passages 192 and a central opening 194 for receiving the adjacent end of a fuel nozzle 196. The housing of each burner 186 can be provided with an air conduit 198 extending therethrough and communicating with the air passages 192 at its upper end and with an air valve 200 and an air manifold 202 at its lower end. The manifold 202 is otherwise of conventional construction and is extended transversely of the hearth 182. A fuel line 204 is also extended upwardly through each burner housing 188 where it is joined to the associated fuel nozzle 196 at its upper end and to a conventional fuel header (not shown) at its lower end.

In this arrangement of the invention, trough cleanout opening or openings, such as those described above and the unloading mechanism associated therewith are eliminated, and each trough 184 is extended across the upper end of the lower furnace wall 44' as denoted by reference character 206. With this arrangement each of the firing troughs 184 open into the lower heating zone 26' of the furnace 10. If desired, the end portions 206 of the troughs 184 can be angled (not shown) where they extend across the lower furnace wall 44' in order to avoid the adjacent skid pipes 18'. With this arrangement, the debris collected in each firing trough 184 is removed therefrom by the fluid actuated cleaning arrangement presently to be described and blown directly into the lower heating zone 26' of the furnace from which it can be periodically removed along with other debris which normally collects on the floor of the heating zone 26'. It will be noted also in the arrangement of FIGURE 8 that the endmost cleaning jet 162 or 162' (FIGURES 4, 6 and 7) can be eliminated. On the other hand, the aforementioned fixed jets 116 or 116' associated with the burners 74 or 74' described above, are replaced by suitable fixed jet arrangements 208 mounted in the trough bottom adjacent the burner housing 188, when the burners 186 are employed.

A number of pop-up jets 158' are mounted centrally of the trough bottom and spaced along the length thereof, as described above in connection with FIGURES 3 and 4 of the drawings. The pop-up jets 158' can be similarly sequenced, along with the fixed jet 208 if desired, or alternatively all of the jets 158' and 208 can be energized simultaneously. In any event, the debris contained within the firing trough 184 is conveyed toward and through the end opening 210 of each firing trough 184 where it is deposited as aforesaid within the lower heating zone 26'. The hot burner gases likewise are exhausted into the heating zone 26' as denoted by flow arrows 212 rather than into the soaking zone 22 (FIGURE 1). It will be understood, of course, that the pop-up jets 158' of FIGURE 8 can be replaced with the fixed jet and ramp structures 164, 174 of FIGURE 6.

Figure 9:
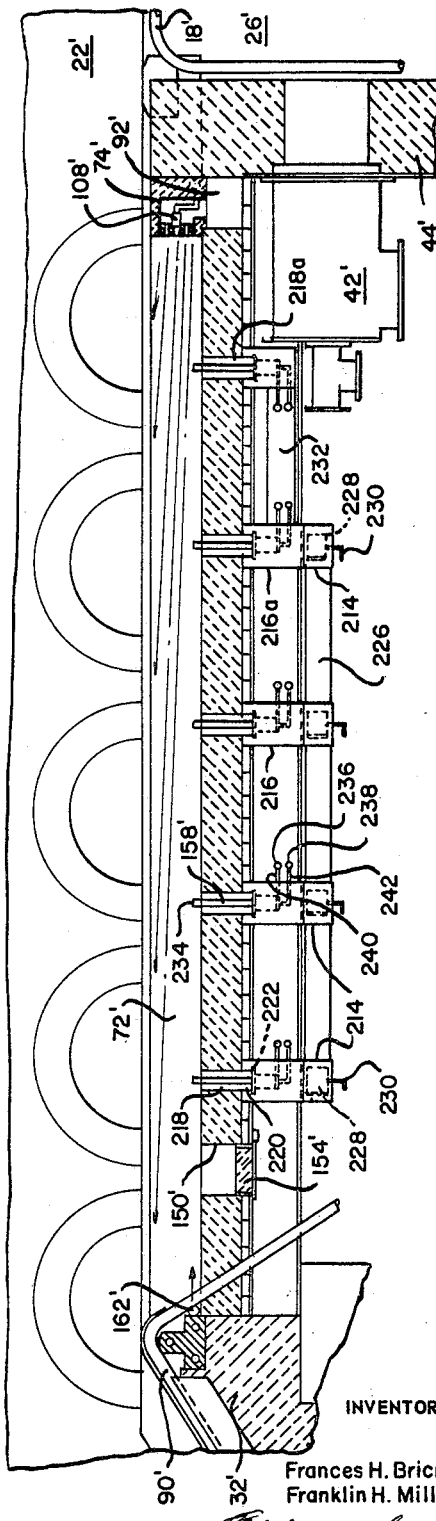
FIGURE 9 is a longitudinally sectioned view similar to that shown in FIGURE 4 but illustrating an arrangement of primary and secondary combustion air supplies for prolonging the flame throughout the length of the hearth firing apparatus.

In the examples noted thus far, the burners 74, 74' or 186 have been operated with excess combustion air or at least a stoichiometric volume of air so as to produce in most cases an oxidizing flame. A flame of this character is useful in restoring the scale which heretofore has been absent at the colder skid mark locations. In the case of particularly long troughs, however, the burner flames may not extend along the entire length of the troughs, which diminishes the amount of scale formed and more importantly causes uneven trough heating. One arrangement for prolonging the burner flames along the length of the firing troughs, when desired, is illustrated in FIGURE 9 of the drawings. In the latter arrangement, the primary combustion air supplied to the burner 74' through the air header 92' is substantially reduced relative to the fuel flowing through the fuel nozzle 108'. The reduction of course can be effected by partially closing the valve (FIGURE 17) associated with the air fitting 130 of the burner air manifold such as the manifold 92 as shown in FIGURE 11. As a result, a reducing flame issues from the burner 74'.

In order to complete the combustion of the fuel and to prolong the burner flame along the length of each firing trough 72', means are provided in the apparatus for introducing additional or secondary combustion air at one or more locations along the length of the firing troughs 72'. When so required, the secondary combustion air can be introduced at a number of spaced locations embracing substantially the entire length of each firing trough.

One arrangement for so introducing secondary combustion air includes the provision of a number of transversely extending air manifolds 214, with four such manifolds 214 being employed in this example of the invention, although a greater or lesser number can be used. The secondary manifolds 214 extend transversely of the hearth 20' and directly beneath an associated four transverse rows of the pop-up jets 158'. Each transverse manifold 214 is provided in this example, with four upstanding conduit sections 216 each of which surrounds the downwardly protruding pop-up jet structure of the similarly positioned jets 158' of the firing troughs 72'. By thus enclosing the exposed jet structures, the secondary combustion air flowing through the manifolds 214-216 provides external cooling for the pop-up jets. When thus mounted, the conduit sections 216 supply combustion air through bottom openings 218 of each firing trough 72' through which the pop-up jets 158' in this example are spacedly protruded. In this example the insulating cores 160 (FIGURE 4) are omitted and secondary combustion air is introduced into each trough through the annular passages 218 respectively surrounding each of the pop-up jets 158'. In this example, secondary combustion air from each upstanding manifold conduit 216 is introduced through the space 220 between the mounting plate 222 and mounting flange 224 (FIGURE 13) of each pop-up jet structure.

The transverse manifolds 214 are supplied at one side of the hearth 20' by a longitudinally extending air header 226. If desired, suitable valve mechanism denoted generally by reference characters 228 can be mounted in each of the transverse air manifolds 214 adjacent their junctions with the longitudinal secondary air header 226. With this arrangement the secondary combustion air, when introduced at various points along the length of each firing trough 72', can be varied longitudinally of the hearth in order to achieve the desired flame characteristics. The valves 228 can be actuated manually or remotely by suitable operating mechanism denoted generally by reference characters 230, and of course can be utilized to shut off one or more of the secondary air inlets 218 of each trough.

Those annular secondary combustion air openings 218a surrounding the pop-up jets 158' which are nearest the trough burners 74' are supplied by an equal number of manifold conduit extensions 232 which extend from the adjacent manifold conduits 216a. Thus, the two transverse rows of secondary air openings 218 which are closest the burner 74' are supplied and controlled by the adjacent secondary air manifold 214 and valve 228. The particular location of the secondary air apertures 218a, as illustrated in FIGURE 9, renders the location of a separate transverse secondary air manifold therefor difficult due to the presence of the heating burners 42' for the lower heating zone 26'. In most applications, however, the secondary inlets 218a can be omitted.

A secondary advantage of the use of secondary combustion air in this fashion is the cooling offered to the upper portions of the pop-up jet structure 158' and particularly the exposed movable member thereof 234, described more fully hereinafter with reference to FIGURE 13 of the drawings. The upward rush of combustion air also prevents scale and other debris from filling the passages 218 and more particularly the finer particles thereof from entering around the moving part 234 of the pop-up jet structures. It is also contemplated that the fixed jet structures 164 of FIGURE 6 can be substituted for the pop-up jet structures 158' of FIGURE 9. In certain applications of the latter arrangement, the inclined ramp structures 174 (FIGURE 6) may not be needed inasmuch as the upward movement of the secondary combustion air around the fixed jets will prevent pieces of scale or other undesirable material from hanging up against the protruding upper ends of the fixed jets and also will afford the necessary amount of cooling thereto.

In this arrangement each lateral row of pop-up jets 158' are coupled to a pair of high-pressure air headers 236 and 238 and individual connecting conduits 240 and 242 for energizing the pop-up jets 158 and to ensure that the jet structures are returned to their retracted positions following such energization. The operation and structural details of the jet structure 158 or 158' are described more fully below in connection with FIGURES 13–16. The air supplies 236 and 238 are maintained separately of the secondary combustion air headers 214 inasmuch as the latter are supplied with low-pressure air in this example.

Referring now to FIGURE 9A, another arrangement for ensuring the substantial continuity of burner flames along the entire length of the trough 72' is illustrated together with another trough cleaning arrangement of the invention. A double-headed burner 231 is mounted centrally in each trough 72', desirably upon a transversely extending air manifold 233, which can be arranged similar to the manifold of FIGURE 11 or 11A. The burner is provided with a pair of mixing baffles 235 disposed in opposite wall portions of the burner and communicating with a common combustion air chamber 237 within the burner. For independent control of the divided trough sections, by thermocouples 239 respectively and associated circuitry such as that illustrated in FIGURE 17, the fuel nozzles of the baffles are connected individually to separate fuel lines 241 and remotely operable valves 243. Alternatively, the fuel lines 241 and their supply conduits (not shown) can be substantially enclosed within the air manifold 233 as in FIGURES 11 or 11A. The burner 231 is thus arranged to direct flames respectively to the remote ends of the trough.

Adjacent the drop-out knuckle end of each trough 72' a cleanout opening 150' is provided, while the other end of each trough opens into the lower heating zone 26' as described in connection with FIGURE 8. Thus the trough cleaning arrangement of each right-hand trough section in this example is similar to that of FIGURE 8, with the exception that three jets 158' are utilized due to the relatively shorter length. On the other hand, the trough-cleaning apparatus of the left-hand trough sections is generally similar to that of FIGURES 3–5 with the same exception. One or more stationary jets 245 are mounted on each side of each burner 231 to clean the adjacent midsections respectively of the associated trough 72'. Although the movable jet structures 158' have been shown in FIGURE 9A, it will be understood that fixed jet structures, such as those illustrated at 244–246 in FIGURE 10 or at 164 in FIGURE 6, can be employed in their stead. The jets of each trough section of a given trough can be sequentially operated at the same or different times, in a manner such as that described with reference to FIGURES 17 and 18.

Figure 10:
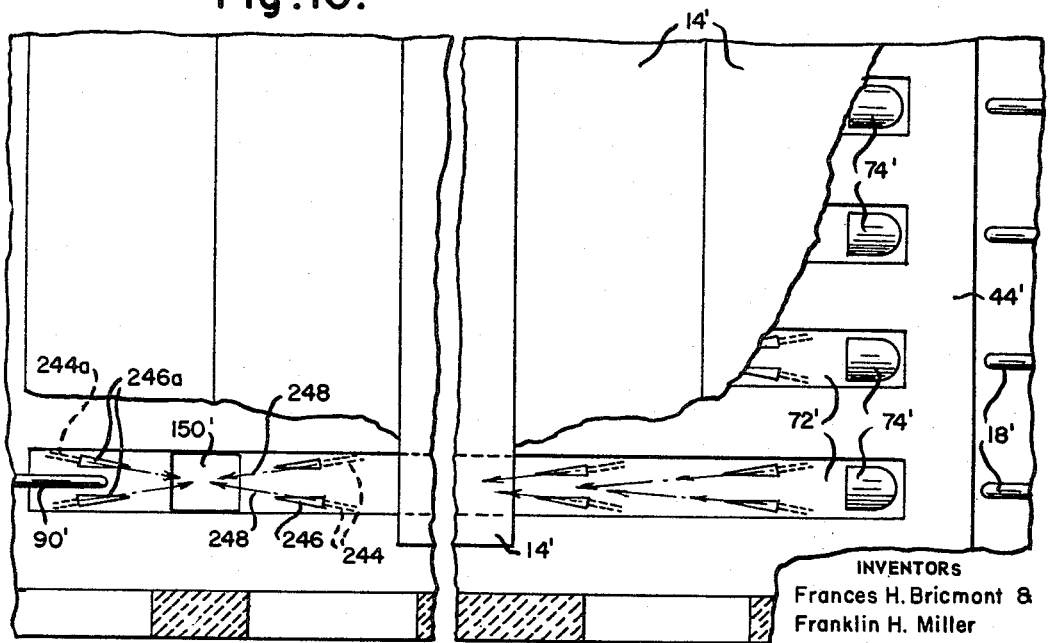
FIGURE 10 is a top plan view of the hearth apparatus similar to that shown in FIGURE 3 but illustrating another arrangement of the trough cleaning apparatus.

Referring now to FIGURE 10 of the drawings, another firing trough cleaning arrangement of the invention is illustrated in the form of an alternative fixed jet arrangement. The organization of FIGURE 10 is generally that as described in connection with FIGURE 6 with the exception that each of the fixed jets 164 of FIGURE 6 is replaced by a pair of fixed jets 244 which are mounted respectively so as to open into the ends of a pair of cutouts or niches 246 formed in the bottom wall structure of the firing trough adjacent the side walls thereof. The niches 246 and the jets 244 are angled slightly inwardly of the firing trough so that the center lines of their fluid streams, as denoted by dashed lines 248, of each pair of jets 244 intersect generally at the center line of the trough bottom and desirably adjacent the succeeding pair of jets 244, with the most remote pair of jets 244 from the burner 74' having their fluid streams intersecting over the single cleanout opening 150' of each firing trough.

Each pair of jets 244 can be operated simultaneously with other pairs of the jets or can be sequenced relative thereto as described above in connection with the jet structures 158 or 158' or the fixed jets 164. The location of the jets 244 at the niches 246 of course obviates the need for the inclined ramps 174 illustrated in FIGURE 6 of the drawings. Moreover, the deposition of debris in the niches 246 is prevented by the fluid streams 248 which are blown periodically and longitudinally therethrough. The end of the firing trough adjacent the burner 74' can be similarly provided with a pair of the jets 244 and niches 246 (not shown) or the jet passages 116 (FIGURE 4) can be incorporated in the burner structure. At the other end of each firing trough 72' of FIGURE 10 a similar pair of jets 244a and niches 246a can be mounted so that their fluid streams 248a likewise intersect over the central portion of the trough opening 150'. Alternatively, the fixed jet arrangement 162 such as illustrated in FIGURE 4 can be utilized at the end of the trough. The use of the fixed jets 244 as located in the niches 246 is advantageous in the length of the trough between the burner 74' and the cleanout opening 150', inasmuch as there are no projecting portions of the jet structure to impede the flow of debris along the trough bottom under impetus of the fluid streams 248.

The undesirable effects of "downtailing" in the hot rolling mill can be compensated in accordance with the invention by operating the firing troughs 72 of the hearth 20' (FIGURE 5) at differing temperatures such that the workpiece temperature increases from the head portion to the tail portion. In an exemplary arrangement, the left-hand outer trough 72a can be operated with a temperature of of 2250° F., for example. Each adjacent trough 72 can be operated at a slightly increased temperature such that the troughs toward the right-hand side of the furnace are each about 15° F. higher in temperature than the preceding adjacent trough and that the right-hand outer trough 72b is operated at 2295° F. Control of the temperatures of the various troughs, as required in this method of operation, can be effected by the arrangement of FIGURE 17.

For other applications having more stringent requirements, downtailing or end-rolling effects or both are compensated still further by means provided by the invention for applying a proportion of the heat of each firing trough 72'a directly to the undersurfaces of the slab 14' which are disposed between or outwardly of the skid marks thereof and hence between or outwardly of the troughs 72'a. One arrangement of such means includes the provision of a pair of beveled hearth surfaces 286 coextending along the length of each firing trough 72' and disposed respectively at the lateral edges of the top openings thereof, as better shown in FIGURE 12. The inclined surfaces 286 thus permit a small proportion of the hot combustion gases to contact those portions of the workpiece lying between the skid marks thereof. In this arrangement, the inclination of the beveled surfaces 286 can be in the neighborhood of 15°, although it will be appreciated that a greater or lesser inclination can be employed and that the inclined surfaces can be wider or narrower than shown, depending upon the quantity of heat desired at the areas between the troughs.

An alternative arrangement for supplying heat directly to the intermediate workpiece surfaces is shown in FIGURE 12A, where the embedded hearth skids 88" project above the surrounding hearth surfaces. The resulting gases 287 provide contact of the intermediate workpiece areas with hot gases from the adjacent firing troughs.

Where it is desired also to compensate for the end rolling effects in the hot rolling mill, as discussed previously, the outermost beveled surface 286a of each outer trough 72a desirably is provided with a greater inclination in order to supply a correspondingly greater quantity of heat to the head and tail end portions of the workpiece 14', as better shown in FIGURE 12B. In the latter arrangement, the beveled surfaces 286a are provided with an inclination exceeding twice that of the remainder of the beveled surfaces 286' such that the aforementioned tail and head portions of the workpiece are heated in this example to about 25 to 50° F. higher than the respectively adjacent portions of the intervening area of the workpiece. In any of the arrangements as shown in FIGURES 12, 12A or 12B it is contemplated, of course, that such intervening area will be heated also to a substantially uniformly increasing temperature along its length by operation of the firing troughs at correspondingly increasing temperatures. However, it is to be understood that the intermediate beveled portions 286 can be omitted as shown in FIGURE 12C, or that the outer beveled portions 286a can be omitted, or that some or all of the beveled portions 286a and 286 can be provided with the raised skid arrangement of FIGURE 12A as denoted by the chain outlines 286b thereof, depending upon the amount of and the particular heating effects desired. In the hearth firing arrangement of FIGURE 12C, the inclusion of a single pair of the inclined surfaces 286a at the outer edges respectively of the outer troughs, one of which is shown in FIGURE 12C, is directed primarily for compensating for the various end-rolling effects of the workpieces. It is to be understood, of course, that downtailing can be compensated partially by operating the troughs at increasing temperatures along the length of the workpieces extending transversely of the troughs and the hearth. The latter consideration applies with equal force to the previously described trough arrangement typified in cross-section by FIGURE 5.

The trough arrangement of FIGURE 12 is useful in certain applications wherein wider skid marks are encountered or where the temperature gradations between the skid mark proper and the surrounding high temperature area of the workpiece are less pronounced. In this instance the inclined hearth surfaces 286 provide coverage of wider skid mark areas or streaks or convey correspondingly lesser amounts of hot gases to the more graduated areas associated with the skid marks, as the case may be. In such applications the inclined surfaces 286 can be narrower and more steeply inclined, as determined by the temperature gradations adjacent the lateral confines of the skid marks.

With reference now to FIGURES 13 and 14 of the drawings, an exemplary pop-up jet structure, arranged in accordance with the invention, is illustrated for use as the jet structures 158 (FIGURE 4), 158'b (FIGURE 7) or 158' (FIGURES 8 and 9). For the arrangement of FIGURE 9 the annular insulating core 160 will, of course, be omitted.

In this arrangement, as shown in FIGURES 13 and 14, the insulating core 160 is seated upon the aforementioned mounting flange 222, which is arranged for securance to the channel irons 76 of the hearth 20 or 20' by means of bolt apertures 250 or by welding or the like. The mounting flange 224 which is bolted to the mounting plate 222 is secured in this example to the upper end of operating cylinder 252 as by welding. An annular piston 254 is mounted for reciprocation within the cylinder 252 and in this example is sealed to the inner walls thereof by suitable sealing means such as O-ring 256. The piston 254 is welded or otherwise secured to an elongated pop-up tube 258 which is reciprocated under impetus of the piston 254 through a guide tube 260, the lower end of which is seated in a counter-sunk central aperture 262 of the mounting plate 222. In this position, the guide tube 260 is aligned with the aperture 262 through which the pop-up tube 258 is extended.

The annular piston 254 is actuated in the up direction as viewed in FIGURE 13, preferably by the high-pressure air or other pressurized fluid introduced into the cylinder 252 through inlet opening 264 in the lower end thereof. When so energized, the piston 254 is forced upwardly carrying the pop-up tube 258 to the operative position thereof as denoted by chain outline 266. At the same time the high-pressure air enters the jet tube 258 through the central opening of the annular piston 254. At the latter position of the jet tube 258, a jet of air is blown longitudinally along the firing trough through the jet aperture 268. When a bi-directional jet structure is required, such as for the air jets 158'a (FIGURE 7), an additional jet opening 268', shown in phantom in FIGURE 13, can be provided at the upper end of the jet tube 258 at a position diametrically opposite the jet aperture 268.

In order to ensure that the jet aperture of apertures 268 are always aligned with the longitudinal axis of the associated firing trough, means are provided by the invention to prevent angular displacement of the annular piston 254 and the jet tube 258. One arrangement of the invention for accomplishing this, includes the provision of a guide 270 extended axially along the interior of the cylinder 252 and along the path of travel of the piston 254. The piston 254 is furnished with a suitably positioned aperture 272 through which the guide 270 is extended so that the piston 254 slidably engages the guide 270 throughout its path of travel. The guide and aperture 270, 272 are located with respect to the jet aperture or apertures in the jet tube 258 so that the latter therefore are assured of proper direction throughout the operative life of the jet structure.

In accordance with another feature of the invention, the guide 270 can be provided in the form of a hollow tube having an outer threaded connection 274. A source of pressurized air or other fluid is then coupled to the guide tube 270 and pressurized fluid is introduced into the guide tube 270 periodically whenever it is desired to return the piston 254 and the jet tube 258 to their retracted positions. With this arrangement, it is not necessary to rely upon gravity to return the moving parts of the jet structure to their retracted positions after the introduction of energizing air or other fluid through the inlet opening 264, is terminated.

In the arrangement shown, the upper limit of piston travel is defined by the counter-sunk portion 276 of the adjacent side of the mounting plate 222. At this position the projection of the inner open end 278 of the guide tube 270 into the closely fitting aperture 272 of the piston operates to apply air pressure and resultant returning force to the upper surface of the piston 254 when it is desired to retract the piston and tube 254, 258. It is contemplated, of course, that fluid at a lower pressure can be utilized for ensuring the retraction of the jet tube 258 and piston 254 than is required for the fluid ejected through the opening or openings 268 and for extending the piston and jet tube. Hence, the inlet opening 264 and the guide tube 274 can be coupled to different appropriate air headers, such as the headers 236 and 238 respectively through connecting tubes 240 and 242 as described in connection with FIGURE 9 of the drawings.

Another arrangement for preventing rotation of the piston and for maintaining jet aperture and trough alignment is embodied in another form of the movable jet structure 158' as shown in FIGURES 15 and 16. In the latter arrangement jet tube 258' is coupled to an annular piston 269 at an eccentric opening 271 thereof, with the result that the central axis of the jet tube 258' and of the mounting plate opening 262' through which the jet tube spacedly extends are displaced from the central axis of the cylinder 252'. Thus the piston 269 is restrained against rotational displacement relative to the cylinder by the eccentricity of the jet tube 258', which is maintained in its position of displaced axial alignment with the cylinder 252' by the guide tube 260'. Thus the jet aperture 268″ is always properly aligned with the associated firing trough in this application of the jet structure.

The guide tube 260′ is closely fitted in the eccentric aperture 262′, and is in this arrangement extended downwardly (as viewed in FIGURE 15) into the cylinder 252′, where the tube's lower end 273 serves as a stop to delimit the upward travel of the piston 269. A return inlet 275 is coupled to the cylinder 252′ to apply fluid pressure to the upper side of the piston 269 to ensure the latter's return when the jet structure is not in use. The lower end portion of the guide tube desirably is provided with a wearing band 277 to provide a close fit and to reduce friction between the jet tube 258′ and the guide tube 260′.

In operation, the pop-up jet structure 158′ of either FIGURES 13 or 15 is energized by pressurized fluid introduced through the cylinder inlet 264 or 264′. The resultant pressure drop across the jet aperture or apertures in the jet tube 258 or 258′ causes fluid pressure to be applied to the under surface of the piston 254 or 269 for displacing the piston and thus to move the associated jet tube 258 or 258′ to its operative position denoted by the chain outline 279 or 279′ thereof. For the application as shown herein, use of the extendible or pop-up jet structure 158 or 158′ minimizes the amount of thermal cycling applied to the jet tube 258 or 258′ as the tube is only momentarily inserted into the path of the burner's flames and then only while fluid is passed therethrough which cools the jet tube.

Figure 17:
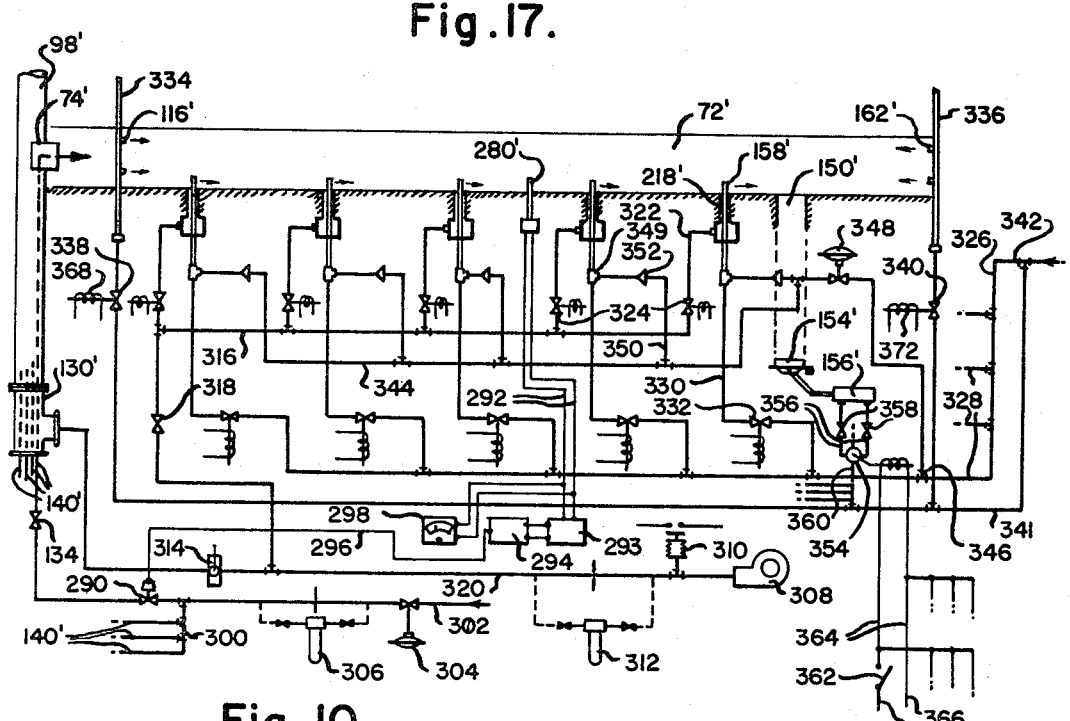
FIGURE 17 is a schematic electrical and fluid circuit diagram of the hearth firing apparatus of the invention.

In FIGURE 17 of the drawings, a schematic electrical and fluid circuit arrangement is illustrated for use in operating one or more of the aforedescribed features of the invention. In the arrangement shown, circuit means are provided for the sequential operation of the fluid-actuated trough cleaning arrangements of FIGURES 3–5, 6, 8, 9, 9A or 10; for automatically adjusting or tempering the burner flames through the use of a temperature sensor such as thermocouple 280 (FIGURE 4) positioned in each of the firing troughs, an arrangement particularly adapted for operating the firing troughs at differing temperatures as set forth in connection with FIGURES 12, 12A, 12B, and 12C; remotely adjusting valves 228 in the secondary combustion air system (FIGURE 9); for remotely and sequentially or simultaneously opening the doors 154 or 154′ of the cleanout hoppers or openings 150 or 150′ (FIGURES 3–5, 6, 9, 9A or 10); and/or sequencing the pneumatic cleaning arrangements of the several firing troughs 72 or 72′, where desired. It will be understood of course that other operating circuit arrangements can be utilized and that one or more of the various features of the invention can be arranged so that their control mechanism can be operated manually.

In the latter arrangement of the invention, the control and supply circuitry are arranged for use with four firing troughs, with one such trough 72′ being shown in FIGURE 17. In this arrangement a four burner air manifold 98′ is utilized and is provided with four individual fuel lines 140′ extending therethrough. Fuel lines 140′ are coupled individually to the burners, one of which is designated at 74′. The air manifold 98′ is otherwise arranged generally as shown in FIGURE 11A of the drawings. The fuel, such as natural gas, supplied to the burner 74′ through the fuel lines 140′ which are controlled individually in this example by a like number of pneumatically operated valves such as the valve 290.

The operation of each valve 290, which in this example, is coupled in series with a manually operated stop valve 134, is controlled by a temperature signal supplied by thermocouple 280′ mounted in the associated firing trough 72′. Each thermocouple signal is conducted through leads 292 to an associated converter or electro-pneumatic transducer and amplifier 293, the output of which is coupled to a synchro-controller 294 which operates the associated pneumatic valve 290 through conduit 296. Desirably, a temperature recorder or the like 298 also is coupled to the thermocouple 280′. The converter 293 and controller 294 can be obtained from Moore Products Co., Springhouse, Pa., Model No. 77 E/P Transducer and Amplifier and Model No. 552 SM Mini-Synchro Control Station, respectively.

Fuel lines 140′ desirably are coupled to a fuel header 300 which in turn is supplied from the fuel main 302 through a suitable flow regulator 304 and flow measuring device such as manometer 306. Similarly, the air fitting 130′ of the combustion air manifold 98′ is supplied from a suitable source of combustion air such as blower 308 through an air pressure switch 310, flow measuring means such as manometer 312 and a manually operated air valve 314. The primary combustion air thus supplied to the manifold 98′ is conducted directly to the burners 74′ which are mounted thereon as described above with reference to FIGURES 11 and 11A of the drawings. A secondary combustion air header 316 is coupled through stop valve 318 to the air supply conduit 320. The secondary air header 316 is coupled through individual conduits 322 to the secondary air inlets 218′ which individually surround at least one of the jet structures 158′ of each firing trough 72′. The structural relationship between the secondary air supply and the jet structures 158′ is more particularly set forth and described in connection with FIGURE 9 of the drawings. It will be understood, of course, that a greater or lesser number of points of secondary air ingress can be provided for each trough 72′. In furtherance of this purpose each of the connecting conduits 322 to the secondary air inlets 218′ are provided with a throttling valve 324 for individually adjusting or shutting off one or more of the secondary air inlets 218′. Desirably the secondary combustion air valves 324 are of solenoid or the like construction so that they can be operated remotely through suitable electric leads and switches (not shown).

Each of the intermediate jet structures 158′ are coupled to a high-pressure air header 326 by means of an air line 328. Individual, valved connecting conduits 330 are coupled between the air line 328 of each trough and the intermediate jet structures 158′ thereof. A two-way solenoid valve 332 is coupled in each connecting air line 330.

The air jets 116′ and 162′ at the ends respectively of each firing trough 72′ in this example are mounted on transversely extending air headers 334 and 336, each of which is coupled through a two-way solenoid valve 338 to a parallel high-pressure conduit 340, which is this example, is connected directly to the source conduit 342, for the high-pressure air header 326. In this arrangement of the invention the solenoid valves 332 and 338 are energized sequentially for the purpose of advancing scale and other debris to the single cleanout opening 150′ of each firing trough. One arrangement for thus sequencing the operation of the jets 218′, 116′ and 162′ is described hereinafter in greater detail in connection with FIGURE 18. In the arrangement of FIGURE 17, it will be seen that each intermediate jet structure 158′ is controlled individually by a valve 332, while the jet structures 116′ or 162′ at the adjacent ends of all of the firing troughs can be controlled with a single valve 338 or 340, for the purpose of ensuring adequate flow of air to each of the intermediate jets 158′.

Each of the intermediate jet structures 158′ of each firing trough 72′ is further supplied from a source of relatively low-pressure air in order to maintain a bleed flow through the intermediate jet structures at all times for cooling the jets and preventing the lodgement of debris therein. An exemplary arrangement for implementing this feature of the apparatus includes the provision of a second parallel air line 344 which is coupled to the associated high-pressure air line 328 as denoted by the reference character 346. A suitable flow regulator 348 is connected in the low-pressure air line 344 to reduce the air pressure therein to the desired level. Alternatively, of course, the low-pressure line 344 can be coupled to a source of low-pressure air (not shown). The intermediate jet structures 158' are coupled to the low-pressure line by means of T-connections 348 and connecting conduits 350, respectively. A check valve 352 is mounted in each of the connecting conduits 350 in order to prevent high-pressure air from entering the low-pressure connecting lines 350 when the solenoid valves 332 are open.

On the other hand, when the pop-up jet structures 158 (FIGURES 4, 13–16 of the invention) are utilized in place of the fixed jets 158', the low-pressure air supply 344–350 can be employed to supply return air to the cylinders 252 through the guide tubes 274, when it is not desired to rely upon gravity for return of the pop-up tubes 258.

As described above in connection with FIGURE 4 of the drawings, each cleanout opening 150' is provided with a hinged bottom cover 154', which in this example is opened when desired through the use of air cylinder 156'. The double-acting air cylinder 156' desirably is controlled by means of a four-way spring return solenoid valve 354 and output conduits 356. A speed control valve 358 is mounted in each output conduit 356 in order to control conventionally the speed of the air cylinder 156' in either direction. The four-way valve 354 of each air cylinder 156' is supplied through inlet conduit 360, with the inlet conduits being coupled in this example to the supply conduit 342 for the end air headers 334 and 336. In this example, each cylinder control valve 354 is arranged for remote operation by means of a remotely located switch 362 and electric leads 364, coupled to a suitable source through supply leads 366.

Referring now to FIGURE 18 of the drawings, an exemplary circuit arrangement for sequencing the operation of the jets, as arranged in FIGURE 17, is illustrated. In the circuit of FIGURE 18, the various circuit components thereof are energized or de-energized, as the case may be, when the circuit is actuated to energize solenoids coil 368 of the valve 338 which in turn actuates the burner jets 116'.

The coils 370 of the intermediate jet valves 332 and the coil 372 of the valve 340 for the jets 162' at the other end of the firing trough 72' are coupled in the circuit of FIGURE 18 so that the jets of each firing trough 72' are sequenced from left to right and then from right to left along the length of the trough, with the result that in each operating cycle each of the jets 158' and the pair of jets 116' are actuated twice, while the pair of jets 162' at the other end are actuated once. In furtherance of this purpose, each of the solenoid coils 368 and 370 are coupled to two pairs of contacts of a stepping switch represented in FIGURE 18 by step coil 374, and pairs of contacts M1–14. The solenoid coil 372, on the other hand, is coupled to a single pair of step switch contacts M7. It will be understood of course, that any other desired sequence can be applied to the operation of the air jet structures depending upon the order in which the contacts of the step switch are connected to the solenoid coils 368–372.

The last contact M1–14 is connected in series with a relay coil 376 forming part of a delay timer represented in FIGURE 18 by timer motor 378 and pairs of contacts DT–1–4. The purpose of the latter connection will be elaborated upon hereinafter. The operation of the stepping switch 374 is controlled by a pulse timer represented by its relay coil 380 and timer motor 382. At the end of each pre-set pulse, the pulse timer coil 380 closes normally open pulse timer contacts PT–2, which in turn actuates the stepping switch coil 374. At the same time the normally closed pulse timer contacts PT–1 are opened by the coil 380 in order to reset the pulse timer. This action continues until the stepping switch is actuated through its complete cycle whereupon closure of its final pair of contacts M–14 energizes delay timer coil 376.

The latter coil closes normally open delay timer contacts DT–2 which energizes the timer motor 378 of the delay timer. At the end of the present timing cycle, the delay timer closes normally open contacts DT–4 to initiate the operation of the pulse timer 380–382. Thereafter delay timer contacts DT–2–4 are opened and its contacts DT–1–3 are closed in order to reset the delay timer.

In order to manually operate the sequencing circuit of FIGURE 18, for example for test purposes, a pushbutton switch 384 is connected in parallel with the pulse timer contacts PT–2 in order to provide alternative energization of the stepping switch 374.

In view of the foregoing it will be apparent that novel and efficient forms of hearth firing apparatus have been disclosed herein. Various arrangements have been shown for maintaining the trough forming part of the apparatus in the requisite clean condition for their continuous use. In furtherance of this purpose, the temperatures of the various troughs can be closely controlled to prevent the collection and pooling of molten slag etc., and to minimize the quantity of scale produced and therefore the amount of cleaning required. Novel circuit means and methods have also been disclosed for operating one or more features of the invention. While we have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

We claim:

1. A hearth firing apparatus for use in a furnace having heating zones in which metal workpieces are supported on longitudinally extending fluid cooled supports, said supports causing longitudinally extending transversely spaced skid marks in said workpieces, a soaking zone succeeding said heating zone, and a hearth in said soaking zone onto and over which said workpieces move after leaving said heating zone and supports, said apparatus comprising a plurality of elongated longitudinally extending transversely spaced firing troughs in said hearth and in longitudinal alignment with said supports respectively, a burner structure mounted in each of said troughs and disposed for directing flames along the passageway defined by said trough and the workpieces positioned thereover, and means on said hearth for conveying a portion of the hot burner gases from at least one of said troughs to the surface portions of said workpieces which are adjacent said conveying means.

2. The combination according to claim 1 wherein said conveying means includes a pair of elongated beveled hearth surfaces substantially co-extending with said firing troughs, said surfaces respectively adjoining the outer lateral edges of the hearth openings of the outermost ones of said firing troughs.

3. The combination according to claim 2 wherein the surface of said hearth includes a plurality of additional beveled surfaces arranged such that a pair of such surfaces adjoin the lateral edges respectively of each firing trough along the hearth opening thereof.

4. The combination according to claim 3 wherein the outermost beveled surfaces adjacent the lateral edges of said hearth are provided with an inclination differing from that of the intermediate beveled surfaces.

5. The combination according to claim 1 wherein said conveying means includes a plurality of skids mounted on said hearth and extending substantially longitudinally thereof, said skids projecting from the adjacent surfaces of said hearth to space said workpieces from the hearth openings of said troughs.

6. The combination according to claim 5 wherein said conveying means includes in addition beveled hearth surface means substantially co-extending with said firing troughs and adjoining lateral edge portions of at least one of said firing trough openings.

7. The combination according to claim 1 wherein said conveying means includes beveled hearth surface means extending longitudinally of said firing troughs and adjoining lateral edge portions of at least one of said firing trough openings.

8. The combination according to claim 1 wherein cleaning means are coupled to each of said troughs for cleaning said troughs.

9. The combination according to claim 8 wherein temperature controlling means are coupled to each of said troughs and to the associated burner structure for independently regulating the operating temperature of each of said troughs.

10. The combination according to claim 1 wherein temperature controlling means are coupled to each of said troughs and to the associated burner structure for independently regulating the operating temperature of each of said troughs to avoid overheating said adjacent workpiece surface portions.

11. The combination according to claim 1 wherein said conveying means co-extend with said troughs, and means are provided in said one trough for extending the burner flames of the associated burner structure of said one trough substantially along the entire length thereof.

12. The combination according to claim 11 wherein said flame extending means include a double-headed burner structure mounted in the mid-section of said one trough and disposed to direct flames in opposite directions along the respectively adjacent lengths of said one trough.

13. The combination according to claim 11 wherein said associated burner structure of said one trough is mounted adjacent an end thereof, said flame extending means include secondary combustion air conduit means coupled to said one trough in communication therewith at at least one point spaced from said associated burner structure.

14. The process of heating metal workpieces resting on and extending transversely of an elongated high temperature hearth having a number of longitudinally extending laterally spaced open troughs therein, said process including the steps of firing each of said troughs through fuel and air passages opening directly into each of said troughs, and progressively increasing the fuel consumptions respectively of the troughs so as to operate the troughs at respectively differing temperatures across the width of the hearth and along the lengths of the workpieces in order to compensate at least partially for temperature downtailing in subsequent fabricational steps.

15. The process according to claim 14 wherein the fuel consumptions of the outer troughs respectively are increased further relative to the adjacent inner troughs to compensate also at least partially for end rolling effects in subsequent hot rolling steps.

16. The process of heating metal workpieces resting on and extending transversely of an elongated high temperature hearth having a number longitudinally extending laterally spaced open troughs therein said process including the steps of firing each of said troughs through fuel and air passages opening directly into each of said troughs, and increasing the fuel consumptions of the outer troughs relatively to the adjacent inner troughs so as to operate said outer troughs at higher temperatures than said inner troughs in order to compensate at least partially for end rolling effects in subsequent hot rolling steps.

References Cited

UNITED STATES PATENTS

| | | | |
|---|---|---|---|
| 3,081,073 | 3/1963 | Conway | 263—6 |
| 3,258,255 | 6/1966 | Tippmann | 263—6 |

FREDERICK L. MATTESON, Jr., *Primary Examiner.*

JOHN J. CAMBY, *Examiner.*